(12) United States Patent
Lei

(10) Patent No.: US 12,367,106 B1
(45) Date of Patent: Jul. 22, 2025

(54) METHODS AND SYSTEMS FOR SPACE RECLAMATION IN IMMUTABLE DEDUPLICATION SYSTEMS

(71) Applicant: Veritas Technologies LLC, Santa Clara, CA (US)

(72) Inventor: Chao Lei, Beijing (CN)

(73) Assignee: Cohesity, Inc., Santa Clara, CA (US)

( * ) Notice: Subject to any disclaimer, the term of this patent is extended or adjusted under 35 U.S.C. 154(b) by 176 days.

(21) Appl. No.: 18/343,211

(22) Filed: Jun. 28, 2023

(51) Int. Cl.
*G06F 11/14* (2006.01)
(52) U.S. Cl.
CPC ...... *G06F 11/1451* (2013.01); *G06F 11/1435* (2013.01); *G06F 11/1453* (2013.01)
(58) Field of Classification Search
CPC ............. G06F 11/1451; G06F 11/1435; G06F 11/1453
See application file for complete search history.

(56) References Cited

U.S. PATENT DOCUMENTS

| | | | | |
|---|---|---|---|---|
| 8,954,398 | B1* | 2/2015 | Zhang | G06F 16/1748 707/687 |
| 9,158,783 | B2* | 10/2015 | Chhaunker | G06F 16/182 |
| 9,298,723 | B1* | 3/2016 | Vincent | G06F 16/183 |
| 10,649,676 | B1* | 5/2020 | De Smet | G06F 3/0608 |
| 11,307,937 | B1* | 4/2022 | Cheng | G06F 11/1453 |
| 2007/0276878 | A1* | 11/2007 | Zheng | G06F 11/1435 |
| 2012/0059800 | A1* | 3/2012 | Guo | G06F 12/0253 707/E17.007 |
| 2013/0144846 | A1* | 6/2013 | Chhaunker | H04L 67/02 707/E17.002 |
| 2013/0346376 | A1* | 12/2013 | Dmitriev | G06F 16/174 707/E17.005 |
| 2021/0042327 | A1* | 2/2021 | Jia | G06F 17/18 |
| 2021/0157777 | A1* | 5/2021 | Yang | G06F 16/1748 |
| 2023/0376423 | A1* | 11/2023 | Li | G06F 12/023 |

* cited by examiner

*Primary Examiner* — Kamini B Patel
(74) *Attorney, Agent, or Firm* — Greenberg Traurig, LLP

(57) ABSTRACT

Embodiments are disclosed that provide space reclamation in immutable deduplication systems, and can include selecting a unit of data of a backup image, determining whether a duplicate unit of data is stored in an existing data storage construct (the duplicate unit of data is a duplicate of the unit of data and the existing data storage construct is stored in immutable storage), and in response to a determination that the duplicate unit of data exists in the existing data storage construct, determining whether the existing data storage construct is designated as being available to be referenced, in response to the existing data storage construct being designated as being available to be referenced, updating a reference to the duplicate unit of data, and in response to the existing data storage construct being designated as being unavailable to be referenced, storing the unit of data in a new data storage construct.

18 Claims, 21 Drawing Sheets

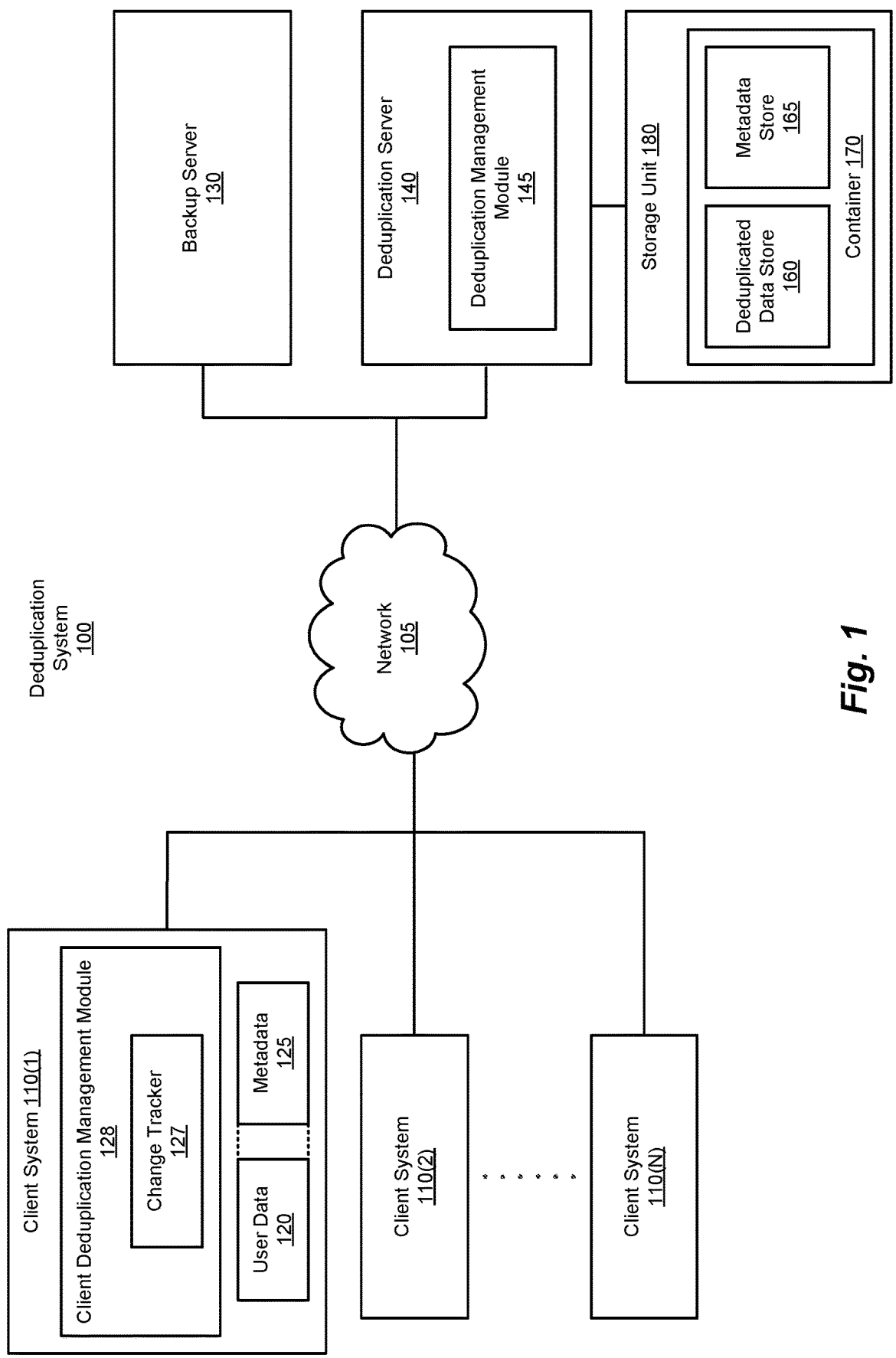

METHODS AND SYSTEMS FOR SPACE RECLAMATION IN IMMUTABLE DEDUPLICATION SYSTEMS

TECHNICAL FIELD

The present disclosure relates to deduplication systems and, more particularly, to methods and systems for space reclamation in immutable deduplication systems.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a unit of information only once. Thus, in a backup scenario, if a unit of information is stored in multiple locations within an enterprise, only one copy of that unit of information will be stored in a deduplicated backup storage volume. Similarly, if the unit of information does not change during a subsequent backup, another copy of that unit of information need not be stored, so long as that unit of information continues to be stored in the deduplicated backup storage volume. Data deduplication can also be employed outside of the backup context, thereby reducing the amount of information needing to be transferred and the active storage occupied by duplicate units of information.

SUMMARY

The present disclosure describes methods, computer program products, computer systems, and the like are disclosed that provide for space reclamation in immutable deduplication systems, in an efficient and effective manner. Such methods, computer program products, and computer systems can include selecting a unit of data of a backup image and determining whether a duplicate unit of data is stored in an existing data storage construct (where the duplicate unit of data is a duplicate of the unit of data and the existing data storage construct is stored in immutable storage). In response to a determination that the duplicate unit of data exists in the existing data storage construct, such methods, computer program products, and computer systems include determining whether the existing data storage construct is designated as being available to be referenced, in response to the existing data storage construct being designated as being available to be referenced, updating a reference to the duplicate unit of data, and in response to the existing data storage construct being designated as being unavailable to be referenced, storing the unit of data in a new data storage construct.

In certain embodiments, further in response to the existing data storage construct being designated as being unavailable to be referenced, such methods, computer program products, and computer systems can include adding data object metadata to the new data storage construct (where the data object metadata is associated with the unit of data).

In certain embodiments, further in response to the existing data storage construct being designated as being unavailable to be referenced, such methods, computer program products, and computer systems can include updating a reference to the duplicate unit of data (where the backup image comprises the reference).

In certain embodiments, the backup image can comprise the reference. In certain other embodiments, the backup image is one of a plurality of backup images, the immutable storage periodically permits deletion of the existing data storage construct, and such methods, computer program products, and computer systems can further include deleting the existing data storage construct, if none of the plurality of backup images comprise any references to the existing data storage construct.

In certain embodiments, the existing data storage construct is one of a plurality of existing data storage constructs, and such methods, computer program products, and computer systems can further include performing an update process on at least one of the plurality of existing data storage constructs.

In certain embodiments, such methods, computer program products, and computer systems can include determining whether the at least one of the plurality of existing data storage constructs is designated as being available and, in response to a determination that the at least one of the plurality of existing data storage constructs is designated as being available, performing the update process on the at least one of the plurality of existing data storage constructs.

In certain embodiments, the update process can include determining one or more thresholds (where the determining the one or more thresholds comprises performing a threshold determination process), determining a state of the at least one of the plurality of existing data storage constructs, determining whether the state of the at least one of the plurality of existing data storage constructs meets the one or more thresholds, and, in response to the state of the at least one of the plurality of existing data storage constructs meeting the one or more thresholds, designating the at least one of the plurality of existing data storage constructs as being unavailable.

In certain embodiments, the determining the one or more thresholds can include determining a retention period of a new container stored in the immutable storage and determining a remaining retention period (where the remaining retention period is a portion of a retention period remaining for the at least one of the plurality of existing data storage constructs). The determining the state of the at least one of the plurality of existing data storage constructs can include determining a size of the at least one of the plurality of existing data storage constructs and determining an amount of expired data stored in the at least one of the plurality of existing data storage constructs.

In certain embodiments, such methods, computer program products, and computer systems can include calculating the one or more thresholds (where the one or more thresholds are calculated based, at least in part, on the retention period and the remaining retention period) and determining the state of the at least one of the plurality of existing data storage constructs (where the state of the at least one of the plurality of existing data storage constructs is determined based, at least in part, on the size of the at least one of the plurality of existing data storage constructs and the amount of expired data).

In certain embodiments, the state of the at least one of the plurality of existing data storage constructs meets the one or more thresholds if $$G/C > R_R/R_{NEW}$$

where
- C=the size of the at least one of the plurality of existing data storage constructs,
- G=the amount of expired data stored in the at least one of the plurality of existing data storage constructs,
- $R_R$=the remaining retention period, and
- $R_{NEW}$=the retention period.

In certain embodiments, the state of the at least one of the plurality of existing data storage constructs meets the one or more thresholds if, for a cost function Cost (an amount of data, an input retention period), $$Cost(C,R_R)+Cost((C-G),R_{NEW})<Cost(C,R_{NEW})$$

where
- C=the size of the at least one of the plurality of existing data storage constructs,
- G=the amount of expired data stored in the at least one of the plurality of existing data storage constructs,
- $R_R$=the remaining retention period, and
- $R_{NEW}$=the retention period.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

FIG. 1 is a simplified block diagram illustrating components of an example of a deduplication system, according to methods and systems such as those disclosed herein.

Figure 2A:
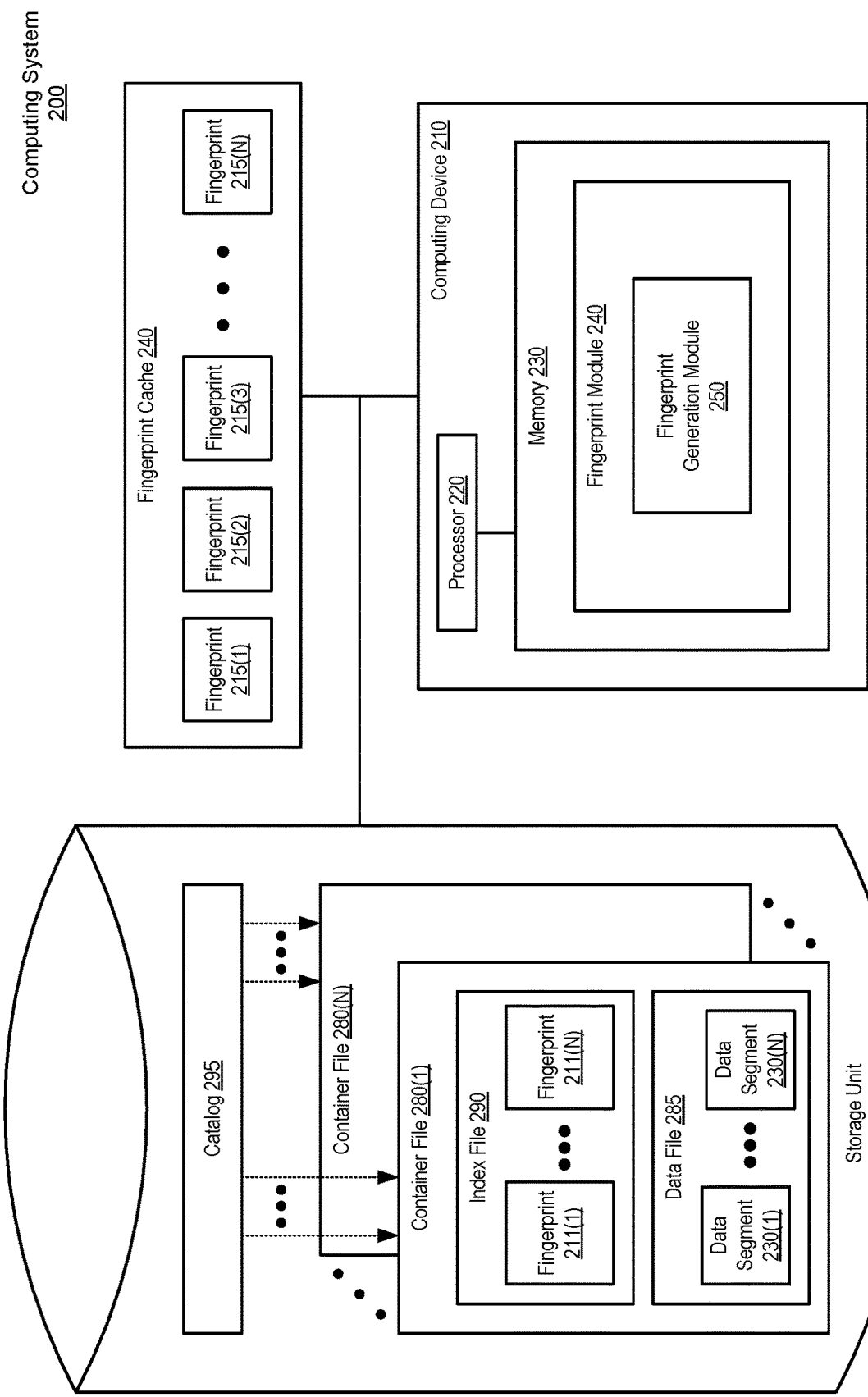
FIG. 2A is a simplified block diagram illustrating components of a computing system supporting deduplication, according to methods and systems such as those disclosed herein.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventive concepts described herein. Rather, any number of variations may fall within the scope of the disclosure, and as defined in the claims following the description.

While the methods and systems described herein are susceptible to various modifications and alternative forms, specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

INTRODUCTION

Methods and systems such as those described herein provide for improved performance in deduplication systems. Broadly, the concepts described herein are applicable to the backup of data, and more particularly, to methods and systems for improving performance in backup systems by way of providing space reclamation in immutable deduplication systems. More specifically, methods and systems such as those described herein provide flexible, efficient, and effective techniques for improved backup performance by employing one or more thresholds that allow, for example, a determination as to the cost of referencing an existing data storage construct (e.g., a container, as might be used to store deduplicated data and its metadata) already stored in immutable storage, versus the cost of storing the data in question in a new data storage construct (e.g., a new data container).

As noted, deduplication techniques are used in backup systems to reduce storage usage for a given amount of data. The data is broken up into a number of data segments, and fingerprints of the data segments are generated and used to identify data duplicates. As the data is being deduplicated, unique data (along with its metadata) is stored in one or more data storage constructs, such as containers. However, with ever-increasing amounts of data to be preserved by way of backups, the storage requirements of such data also continue to increase, even with techniques such as deduplication. With backend storage becoming increasingly voluminous, it becomes increasingly difficult (and expensive) to maintain an ever-increasing number of containers in general purpose storage (where such data is quickly accessible and, typically, easily modified/deleted), but at comparatively high cost. To address such situations, such containers can be stored in immutable storage, such as that provided by today's cloud storage providers. In so doing, such containers can be stored at comparatively low cost, with the understanding that use of such storage is constrained in the frequency with which data stored therein can be modified and/or deleted. For example, certain types of immutable storage provide for modification and/or deletion of data only periodically (e.g., monthly, quarterly, annually, or the like), meaning that containers stored therein can, for example, only be deleted at those predefined points.

In deduplication systems, the containers produced by the deduplication process will, as time goes on, include larger and larger amounts of expired data (colloquially referred to as "garbage"). In order to reclaim storage space used by a given container with dwindling amounts of "live" data (data that is referenced by one or more existing backup images), one or more compaction techniques are typically employed. Compaction is an efficient way to reclaim space in container-based deduplication system. Unfortunately, a container stored in immutable storage (e.g., immutable object storage) cannot be compacted until the container's retention period (also referred to herein as the container's retention time) has elapsed. As will be appreciated, such a constraint can result in large numbers of containers (storing an unacceptably large amount of garbage) can result, particularly where one or more backup images reference (a potentially minimal amount of data in) such a given container or containers, at a point in time (e.g., the end of the aforementioned retention period), thus causing a relatively large amount of expired data to be needlessly stored in order to maintain the potentially minimal amount of in-use data. Making matters worse is a situation in which the given container or containers are deleted or expire soon after the opportunity to have deleted the container(s) has passed. Embodiments such as those described herein provide \ mechanisms for managing the container references based on the retention periods and reclaimable space in containers.

An example of such situations in a container-based deduplication system is where one container stores data segments from multiple backup images. Only when the backup images referencing that container expire, may that container be reclaimed. Before that time, the container may contain a significant amount of garbage, and so, waste system resources and incur costs. Deduplication systems generally use compaction to replace such containers with a smaller ones, in which space containing garbage data has been removed. But compaction does not work on immutable storage because the container is locked and cannot be changed or removed until the container's retention period has passed.

Thus. in a deduplication backup system that employs immutable storage, multiple data segments (or more simply, "segments," including their associated metadata (e.g., segment objects)) are stored in a container, which is then uploaded to the immutable storage system as a single object (e.g., in object storage such as cloud storage), this object can be locked for a period of time referred to as a retention period. The segments in that container may be referenced by backup images continuously, and those backup images may have different retention, some retention may be shorter than the existing retention of the container, some are longer. As a result, the retention of container may have to be continuously/repeatedly extended, prolonging the amount of time the garbage data is maintained in the container (rather than being able to be reclaimed). Embodiments such as those described herein provide a mechanism that helps to avoid such situations by preventing new backup images from referencing containers when those containers meet certain criteria.

In a system such as that described herein, compaction is still running in the manner of a non-immutable system, but instead of compacting containers, a threshold is used to make a decision whether to reference duplicate segments in the existing container. The threshold can, for example, be static and tag-based. Such an approach designates the containers as being unavailable for referencing, such that containers thus designated are not referenced by new backup images. In the alternative, the threshold can be dynamic. In such embodiments, the one or more thresholds generated can be based on the size of garbage in the given container and the given container's retention period.

In the case of an implementation employing a static threshold, determinations can be made prior to the storage and reclamation of containers in immutable storage. In such scenarios, a static threshold can be based on historical factors determined empirically.

For immutable object storage, a tag for container can be added to indicate whether the container in question is available for referencing (or not). If the tag value is "unavailable" the container will not accept new reference, and "available" otherwise. The tag value is calculated from the percentage of garbage in container. A threshold may be set statically in a configuration file, for example. For example, a static threshold of a garbage space percentage of 50% can be used, where the tag is set to "unavailable" when garbage space percentage is greater than 50%, and otherwise, the tag value is "available".

For new backup images, embodiments such as those described herein determine whether the data segment to be referenced is in an unavailable container. In that case, the backup image can reference an unavailable container only when unavailable container's retention period is shorter than the retention period of the container. Otherwise, the backup image cannot use that container's segments, and instead has the new segments written to a new container. As described subsequently, certain embodiments allow available containers can be referenced freely. In certain embodiments, the time of deletion of an unavailable container is fixed, and as such, will be reclaimed at that time (with certainty).

In the case of an implementation employing a dynamic threshold, determinations can be made during the storage and reclamation of containers in immutable storage. Certain embodiments of such dynamic thresholding are cost-based. In such embodiments, backup images stop referencing segments in an existing container when the cost is less to reference/add data segments to a new container than referencing such data segments.

For example, assume a container and the need decide whether to reference a data segment in that container. In such a scenario, we can use the following constraints:

C is the size of the at least one of the plurality of existing data storage constructs, G is the amount of expired data, $R_R$ is the remaining retention period (e.g., for the container), and $R_{NEW}$ is the retention period (in this example, of a new container stored in immutable storage, though other constraints can be used here such as the retention period for the immutable storage in which the containers are stored or other such relevant constraint). In certain embodiments, this can be the retention associated with a new backup image.

In this scenario, the new backup image has duplicate segments in the example container noted above, and as result, the size of duplicate data segments is at most C-G. In that case, the cost of referencing those duplicates is $C*R_{NEW}$, while the cost of not referencing those duplicates is $C*R_R+(C-G)*R_{NEW}$. Thus, the following inequality can be used to make a decision as to whether to allow the container (data segments) stored in immutable storage versus storing the data segments in a new container as being:

$$C*R_R+(C-G)*R_{NEW}<C*R_{NEW}$$

The question captured by this equation is then whether the cost of not referencing the container is less than continuing to reference the container. This reduces to:

$$G/C>R_R/R_{NEW}$$

In approximate terms, this inequality represents the garbage space percentage exceeding the retention time percentage. With either type of threshold, the space consumed by unreferenced data segments (garbage) in the deduplicated storage system is predictable and can be kept an expected level. This is accomplished by making the reclamation of containers stored in immutable storage more predictable.

Further, in addition to the inequality described above, object storage pricing can be considered in determining whether a given container should remain (or once again become) available for referencing by backup images by way of functions (e.g., a step function, for example). To this end, functions that take into consideration object storage pricing can be designed using available storage methods. Using such an approach, an inequality such as the following can be employed:

$$Cost(C,R_R)+Cost((C-G),R_{NEW})<Cost(C,R_{NEW})$$

where Cost(storage_size, retention_period) is a cost function. The definition of such a cost function, in certain embodiments, may depend on the pricing offered by different storage providers/techniques and different storage tiers offered. Generally, such functions are not linear functions of either storage size or retention period for a given storage tier.

For example, Table 1 reflects an example of such considerations, with regard to modifiable cloud storage.

TABLE 1

Example storage costs on a per-unit-per-period basis for modifiable storage.

| Amount of Storage | Cost |
|---|---|
| 100 TB/period | $0.025 |
| 300 TB/period | $0.020 |
| 700 TB/period | $0.019 |

Alternatively, Table 2 reflects an example of such considerations, with regard to immutable cloud storage (e.g., object storage).

TABLE 2

Example storage costs on a per-unit-per-period basis for various levels of immutability and the costs associated therewith.

| Amount | Level 1 Cost | Level 2 Cost | Level 3 Cost | Level 4 Cost |
|---|---|---|---|---|
| 100 TB | $0.20/GB | $0.015/GB | $0.03/GB | $0.004/GB |
| 200 TB | $0.19/GB | $0.014/GB | $0.02/GB | $0.003/GB |
| 500 TB | $0.18/GB | $0.013/GB | $0.01/GB | $0.001/GB |

In Table 2, the various levels will be appreciated to be increasingly less expensive, but also increasingly less accessible (and so, in a certain sense, more immutable), with Level 1 being modifiable, Levels 2 and 3 taking longer to be altered, and Level 4 being immutable (with modification/deletion being based on a retention period). As such, Table 2 thus demonstrates the step-wise function of cost.

Thus, for the preceding examples and a specific storage class or tier, Cost( ) for modifiable storage or immutable storage is a step function. For example, other factors can be included in determining the cost of referencing an existing container stored in immutable storage versus the cost of storing the data segment in question in a new container. While such costs can generally include the costs of computational resources and network resources (in addition to storage costs), such costs can include computational costs (e.g., with respect to searching for duplicate data segments that may be stored in immutable storage, costs related to provisioning one or more virtual machines, and the like), network and computational costs involved in creating a new container and storing data segments therein, and other factors related to the determining and storing a reference to a data segment in a container stored in immutable storage versus the generation of a new container and storage of the data segment therein. It is these factors, as well as others, that embodiments such as those described herein take into consideration, when controlling the referencing of containers stored in immutable storage by backup images.

Example Deduplication Architecture

In general terms, data deduplication is a technique for reducing the amount of storage needed to store information by dividing such information into chunks and eliminating duplicates thereof. In the deduplication of data backups, such chunks are referred to as data segments. Such data segments can be identified by a sufficiently-unique identifier of the given data segment (the sufficiency of the identifier's uniqueness being an acceptably low probability of unique data segments mapping to the same identifier). As will also be appreciated, such fingerprints can be generated by, for example, a fingerprinting algorithm, which is an algorithm that maps a data segment to a smaller data structure (e.g., of shorter length), referred to generically herein as a fingerprint. A fingerprint uniquely identifies the data segment and is typically used to avoid the transmission and comparison of the more voluminous data that such a fingerprint represents. For example, a computing system can check whether a file has been modified, by fetching only the file's fingerprint and comparing the fetched fingerprint with an existing copy. That being the case, such fingerprinting techniques can be used for data deduplication, by making a determination as to whether a given unit of data (e.g., a file, portion there of (e.g., a data segment), or the like) has already been stored. An example of a fingerprint is a hash value. Hashing algorithms such as Message-Digest Algorithm 5 (MD5), Secure Hash Algorithm 1 (SHA-1), and Secure Hash Algorithm 256 (SHA-256) and the like can be used to generate hash values for use as fingerprints.

The function of a hashing algorithm is a function that can be used to map original data of (what can be arbitrary) size onto data of a fixed size, and in so doing, produce a value (a hash value) that is unique (with a sufficiently high level of confidence) to the original data. With regard to a hash function, the input data is typically referred to as the "message" and the hash value is typically referred to as the "message digest" or simply "digest."

During a backup, clients and/or other computing systems may present duplicate data within a set of data that is to be backed up. In addition, if a set of data is backed up multiple times, the data that is unchanged also results in duplicates of previously backed up data. In order to prevent backing up duplicate data from one or more clients, backup systems can implement deduplication, which removes duplicate copies of data while keeping track of how the stored unique data is being referenced. Deduplication can be used not only to preserve storage space when backing up data from client systems, but also avoids the unnecessary transfer of duplicate data.

As will also be appreciated, hardware failure is not an entirely uncommon event in today's information processing systems. Also not infrequently, the cause of such hardware failures is related to the storage systems in which such information is maintained. In light of such challenges, data protection has always been, and indeed, continues to be an important consideration in the reliable operation of such information processing systems. Traditionally, for online/operational data, different technologies (e.g., redundant array of independent disks (RAID) storage systems or mirroring/replication storage systems) have been employed to provide fault tolerance. Mirroring provides one or more full redundant copies of the data being protected, with virtually no performance impact, but suffers from a significant increase in storage consumption. Alternatives to mirroring include various levels of RAID storage systems (e.g., RAID4, RAID5, RAID6, and the like), which provide fault tolerance to a degree that is similar to that provided by mirroring storage systems.

FIG. 1 is a simplified block diagram illustrating components of an example of a deduplication system (depicted, for example, as a deduplication system 100), in which the present disclosure can be implemented. Deduplication system 100 includes a network 105 that communicatively couples one or more client systems 110(1)-(N), a backup server 130, and deduplication server 140 (includes a deduplication management module 145). Each component is discussed in further detail below.

One or more client systems 110(1)-(N), also referred to herein as client devices 110 and/or client systems 110, can be implemented using, for example, a desktop computer, a laptop computer, a workstation, a server, or the like. An example of such computing devices is described subsequently. One or more client systems 110(1)-(N) can be configured to communicate with backup server 130 and deduplication server 140 via network 105. An example of network 105, which can be used by client systems 110 to access backup server 130 and deduplication server 140, is a local area network (LAN) utilizing Ethernet, IEEE 802.11x, or some other communications protocol. While FIG. 1 illustrates client system 110(1) including user data 120 and metadata 125 (and such being associated with one another, by dotted lines), each client system can store different user data 120 and metadata 125 in storage local to the client system.

Also shown as being implemented in client system 110(1) is a change tracker (illustrated in FIG. 1 as a change tracker 127). Change tracker 127 can be implemented, for example, as part of a client deduplication management module (illustrated in FIG. 1 as a client deduplication management module 128). Moreover, change tracker 127 can be implemented, for example, as a change block tracker, detecting data (e.g., data blocks) written by, for example, an application executed by client system 110(1). Such a change block tracker can track units of storage (e.g., disk sectors, data blocks, or the like) that have been changed, for example, by the aforementioned application. Such a list of changed units of storage is referred to herein as a data object change tracking list, or more specifically, a file change tracking list (and more generically as a change tracking stream). Once identified, such changed units of storage can be transferred from the computing system in question to a backup server (e.g., backup server 130) or a deduplication server (e.g., such as deduplication server 140), for example. In certain embodiments, such changed units of storage can be sent to a proxy server, for further conveyance to the proper destination, then or at a later time. As will be appreciated in light of the present disclosure, such an implementation is presented merely as an example, and such change tracking can be performed by any computing device shown in FIG. 1 (e.g., by deduplication server 140) and/or another computing device not shown in FIG. 1.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of user data 120 may also be transferred to backup server 130 and/or deduplication server 140 via a network 105 to be included in a deduplicated data store 160, with the associated metadata (e.g., metadata 125) stored in a metadata store 165 of a container 170. In turn, container 170 can be stored in a storage unit 180. As will be appreciated in light of the present disclosure, storage unit 180, in storing containers such as container 170, can be implemented in a number of ways. More specifically, storage unit 180 can include storage that allows for modification of the information in container 170 (e.g., as might be the case in which container 170 is not yet full), and immutable storage (e.g., as might be the case in which container 170 is full and is to be archived). Each of client systems 110 can send different user data and metadata to backup server 130 and/or deduplication server 140.

In certain embodiments, metadata 125 includes data regarding user data 120 stored as deduplicated data in deduplicated data store 160. Metadata 125 can be generated by client system 110(1), such as during a backup process. Whenever a user (e.g., an application or human user) requests that client system 110 add all or part of user data 120 to deduplicated data store 160 (e.g., as part of a regularly scheduled full or partial backup of the client system), client system 110(1) can read user data 120 and metadata 125 (or generate metadata 125 about user data 120), such as one or more identifiers (also referred to herein as signatures), that can identify different portions of user data 120. Client system 110 can provide metadata 125 as a list (e.g., a list of signatures) to deduplication server 140. Metadata 125 can be used by deduplication server 140 to determine whether a portion of user data 120 is not already stored in deduplicated data store 160 (and so should be added to deduplicated data store 160).

As noted, backup server 130 is also coupled to network 105. Backup server 130 can include one or more physical servers configured to perform a variety of tasks related to management and implementation of backup services for deduplication system 100, such as performing a full or partial backup of a client system. In deduplication system 100, backup server 130 is further configured to communicate with deduplication server 140 for purposes of storing backups of data from client systems 110(1)-(N) in resources controlled by deduplication server 140. Such communication can be via network 105 or via a direct link between backup server 130 and deduplication server 140. Information that can be provided by backup server 130 to deduplication server 140 can include a unique identification associated with each data stream provided by one of client systems 110(1)-(N) to deduplication server 140. Backup server 130 can also provide sequence number identification for to identify sequential data transmitted in each uniquely identified data stream. Deduplication server 140 (and more particularly, deduplication management module 145) can then use such information to associate received data streams from client systems 110(1)-(N) in accord with embodiments of the present disclosure, as further discussed subsequently.

Backup services can be implemented in deduplication system 100 as a client-server application (not shown), with a server component (e.g., residing in backup server 130) and a client component (e.g., residing on client systems 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks on the clients, maintaining databases related to files and other information backed up from file systems associated with the clients, and managing or tracking resources storing backups of client systems 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services, which can be managed by deduplication management module 145. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Such storage can be managed by deduplication management module 145. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client systems 110) of the client-server application. For example, during a backup process for storing a backup of user data 120 in deduplicated data store 160, a client component of the deduplication services can be configured to generate metadata 125 about user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is in turn coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in deduplication system 100 will be stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that includes various metadata regarding the deduplicated data stored in deduplicated data store 160, such as information regarding backup images stored in deduplicated data store 160 (also referred to herein as a catalog), including, in certain embodiments, references to the files included in a given backup. It is these references (e.g., file references) to which methods and systems such as those described herein are directed, with regard to improving the efficiency with which such references are managed. That being the case, metadata store 165 is configured with data constructs and structures, such as those described subsequently herein, in order to facilitate performance of processes such as those also described subsequently herein.

The various metadata (including metadata 125) can be stored in, among other locations, a central index. For example, deduplication server 140 can use metadata 125, such as the list of signatures from client systems 110, to determine if portions of a backup image (e.g., portions of user data 120) are non-duplicative of portions already stored in deduplicated data store 160. Once deduplication server 140 determines that a portion of user data 120 is not duplicative of the data already stored in deduplicated data store 160 and thus should be added to deduplicated data store 160, deduplication server 140 can store a corresponding identifier, or signature, of portion of user data 120 in the central index. Deduplication server can request the non-duplicative portions (or unique portions) from client systems 110 by identifying the unique portion with the portion's associated signature.

As the unique portions are received via a data stream from client systems 110, the unique portions can be written into a fixed-size container (e.g., also referred to herein as a container file, and includes these and/or other storage construct) stored at deduplication server 140, such as in a cache or other storage unit. Once the container is full of unique data segments, in certain embodiments, the entire container can be written to a location in deduplicated data store 160. The container written to the deduplicated data store 160 can also include a local container index, which indicates a local location of each unique portion stored within the container. The local container index can include a signature associated with each unique segment stored in the container, or alternatively can include a shortened version of the signature of each unique segment stored in the container. Deduplication server 140 can maintain information identifying a container (e.g., a container identifier (a "container ID") of the container, also referred to as a data container identifier (DCID)) in a central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backup images can be stored in deduplicated data store 160. For example, a first backup image can be captured from user data 120 and can be stored in deduplicated data store 160. A subsequent backup image captured from user data 120 can include duplicate portions that are identical to portions of the first backup image already stored in deduplicated data store 160 and can include unique portions that are not identical to portions of the first backup image (e.g., portions that correspond to changed user data 120). The unique portions of the subsequent backup image can be written to deduplicated data store 160, while the duplicate portions will not be written (since the duplicate portions are identical to instances of portions already stored in deduplicated data store 160). Since only single instances of portions of a backup image are stored in deduplicated data store 160, metadata store 165 can provide a mapping of a backup image to the various non-duplicative portions stored in deduplicated data store 160 that compose the backup image. Thus, a single backup image can be associated with multiple portions stored throughout deduplicated data store 160, and multiple backup images can be associated with a single portion (e.g., the multiple backup images share the single portion). For example, the subsequent backup image can be associated with unique portions of the subsequent backup image that were written to deduplicated data store 160 and with unique portions of the first backup image that were previously written to deduplicated data store 160. Metadata store 165 can store associations between a backup image and the portions that compose the backup image as a group of references or pointers, where each reference indicates an entry of the central index that corresponds to a portion included in the backup image.

As additional backup images are added to deduplicated data store 160, backup image data can become fragmented across deduplicated data store 160 as portions of changed user data 120 are stored. Thus, a recent backup image stored in deduplicated data store 160 may include portions of recently changed user data 120 contiguously located in deduplicated data store 160, and may include multiple references to previously changed user data associated with older backup images, which are stored in various non-contiguous locations throughout deduplicated data store 160. If a user were to restore the recent backup image from deduplicated data store 160, deduplication server 140 would have to read numerous portions of data associated with older backup images from across the various locations (e.g., various containers) in deduplicated data store 160. Thus, as a backup image becomes more fragmented, restoration of the backup image can become more inefficient due to the increasing amount of time spent on performing a growing number of access operations needed to read each portion of data of the backup image from various locations in deduplicated data store 160 (e.g., determining a location for each of the multiple portions from metadata store 165).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's operating system (OS), for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), SSD and/or FLASH memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2B:
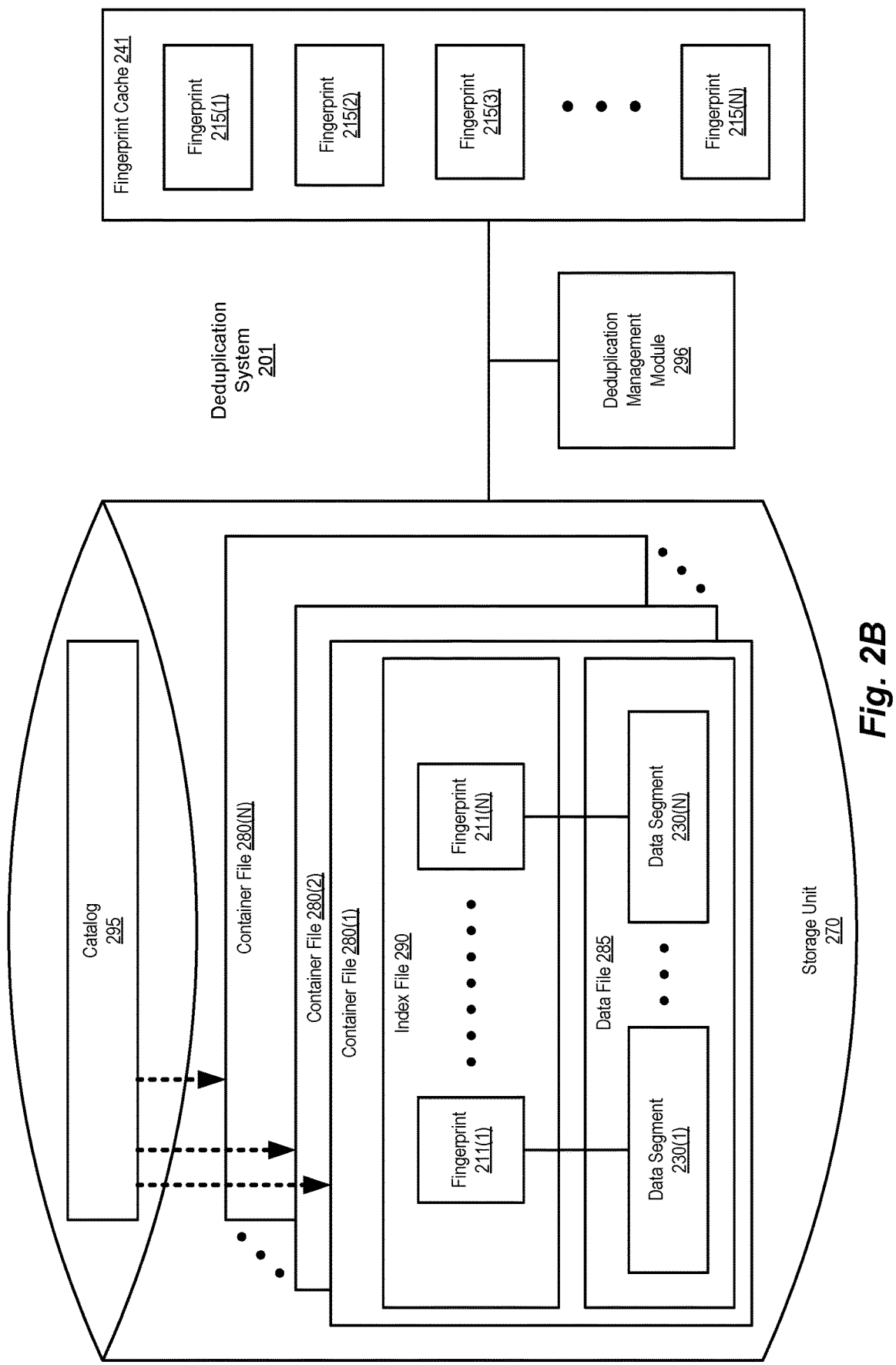
FIG. 2B is a block diagram of a computing system that stores multiple fingerprints and their associated data segments in a container, according to methods and systems such as those disclosed herein.

FIG. 2A is a block diagram of a computing system (which can be a client computing system or a server computing system, and which is depicted in FIG. 2A as a computing system 200; a deduplication system 201 is therefore depicted in FIG. 2B). Computing system 200 includes a computing device 210, a storage unit 270, and a fingerprint cache 240. As will be appreciated in light of the present disclosure, a fingerprint cache such as fingerprint cache 240, in certain embodiments, facilitates a determination as to whether data represented by a given fingerprint is stored in the system, as well as facilitating the identification of the container file in which the data in question (i.e., that represented by the given fingerprint) is stored. As shown, computing device 210 is communicatively coupled to storage unit 270 and fingerprint cache 240. Computing device 210 can be implemented using one or more of a variety of different types of computing devices, including a server, personal computing device, laptop computer, net book, personal digital assistant, cellular phone, or the like. It is noted that this is a simplified example, and that other embodiments can include far more complex organizational and configuration schemes than are shown here.

Computing device 210 includes a processor 220, and memory 230. Computing device 210 also includes a fingerprint module 240 which implements a fingerprint generation module 250. Fingerprint generation module 250 generates new fingerprints for a given data segment by implementing, for example, a fingerprint generation routine that generates a hash value corresponding to the given data segment. In this example, fingerprint generation module 250 implements a routine that uses a fingerprinting algorithm to generate a fingerprint (hash value).

Storage unit 270 stores a number of container files (e.g., such as one of container files 280(1)-(N), referred to herein for the sake of simplicity as container file 280, as an example of a container file and/or other such storage constructs) which includes a data file 285 and an index file 290. In this example, index file 290 stores fingerprints (e.g., fingerprints 211(1)-(N)) and data file 285 stores data segments (e.g., data segments 230(1)-(N)). Fingerprint cache 240 is a dedicated cache for storing fingerprints (depicted in FIG. 2A as fingerprints 215(1)-(N)). As will be appreciated in light of the present disclosure, the fingerprints stored in fingerprint cache 240 can represent data objects generally (e.g., data storage constructs such as files and the like). In a manner such as that noted earlier, storage unit 270 can store container files 280 in one or more modifiable storage locations, and subsequently move full containers to immutable storage locations (e.g. under the control of deduplication management module 296).

Computing device 210 is coupled to storage unit 270. In this example, storage 270 stores container file 280, but can also store data (not shown) in addition to container file 280, and can do so using other formats. Storage 270 can be a persistent storage device and can include one or more of a variety of different storage devices, including hard disks, compact discs, digital versatile discs, solid state drives (SSDs; e.g., FLASH memory), and the like, or one or more logical storage devices such as volumes implemented on one or more such physical storage devices.

Computing device 210 is also coupled to a fingerprint cache 240. In this example, fingerprint cache 240 can be main memory, an SSD, or even a file, and implements a cache such that data (e.g., frequently accessed fingerprints) can be served to computing device 210 in an expeditious manner to determine the existence of a given fingerprint and where the data represented by that fingerprint is stored, versus, for example, from a slower storage device (e.g., a hard disk drive (HDD)). However, fingerprint cache 240 can be implemented on one or more of a variety of different storage devices, including hard disks, compact discs, digital versatile discs, and the like, or on one or more logical storage devices such as volumes implemented on one or more such physical storage devices.

Computing device 210, storage unit 270, and fingerprint cache 240 can be integrated (e.g., where the storage device is coupled to the node's internal processing devices by an internal bus and is built within the same chassis as the rest of the node) or separate. If separate, computing device 210, storage unit 270, and fingerprint cache 240 can be coupled by a local connection or via one or more networks (e.g., local area networks (LANs) and/or wide area networks (WANs) (not shown)).

FIG. 2B is a block diagram of a computing system that stores multiple fingerprints and their associated data segments in a container file. In such a deduplication backup system (depicted in FIG. 2B as deduplication system 201), data storage constructs such as data segments (e.g., data segments 230(1)-(N)) are depicted as being stored in a data file (e.g., such as data file 285) of container file 280(1). Each container file includes an index file (e.g., such as index file 290) and a data file (e.g., such as data file 285). In this example, index file 290 stores fingerprints 211(1)-(N) and data file 285 stores data segments 230(1)-(N). In the embodiment depicted in FIG. 2B, each of fingerprints 211(1)-(N) corresponds to a corresponding one of data segments 230(1)-(N). Also as shown in FIG. 2B, fingerprint cache 241 stores fingerprints 215(1)-(N). For example, after data segments and their associated fingerprints are stored in a container file 280, fingerprint cache 241 can be maintained to indicate that the data segment in question is stored in a container file 280 (and so is a duplicate).

As before, fingerprints 215(1)-(N) represents data storage constructs generally (e.g., the aforementioned data segments, and/or files or the like). In a deduplication backup systems that implement fingerprints, an index file can be employed to separately record fingerprint information, data segment location, and data segment size for each unique fingerprint associated with a data segment (e.g., <fp1, size1, offset1>, <fp2, size2, offset2>, and so on, as described, for example, in connection with FIG. 3B, subsequently). Also, the index file may include other information about the data segments, including (but not limited to) information indicating whether the data segment is compressed, encrypted, and/or has other such characteristics that may need to be taken into account when accessing that data segment.

Deduplication system 201 can include, for example, a deduplication management module 296 to manage various of the aforementioned information. For example, deduplication management module 296 can manage insertion of fingerprints in index file 290, data segments in data file 285, storage of fingerprints in fingerprint cache 241, and references and other information in catalog 295. Further in this regard, deduplication management module 296 can perform or cause to be performed deduplication management operations such as those described elsewhere herein.

Figure 3B:
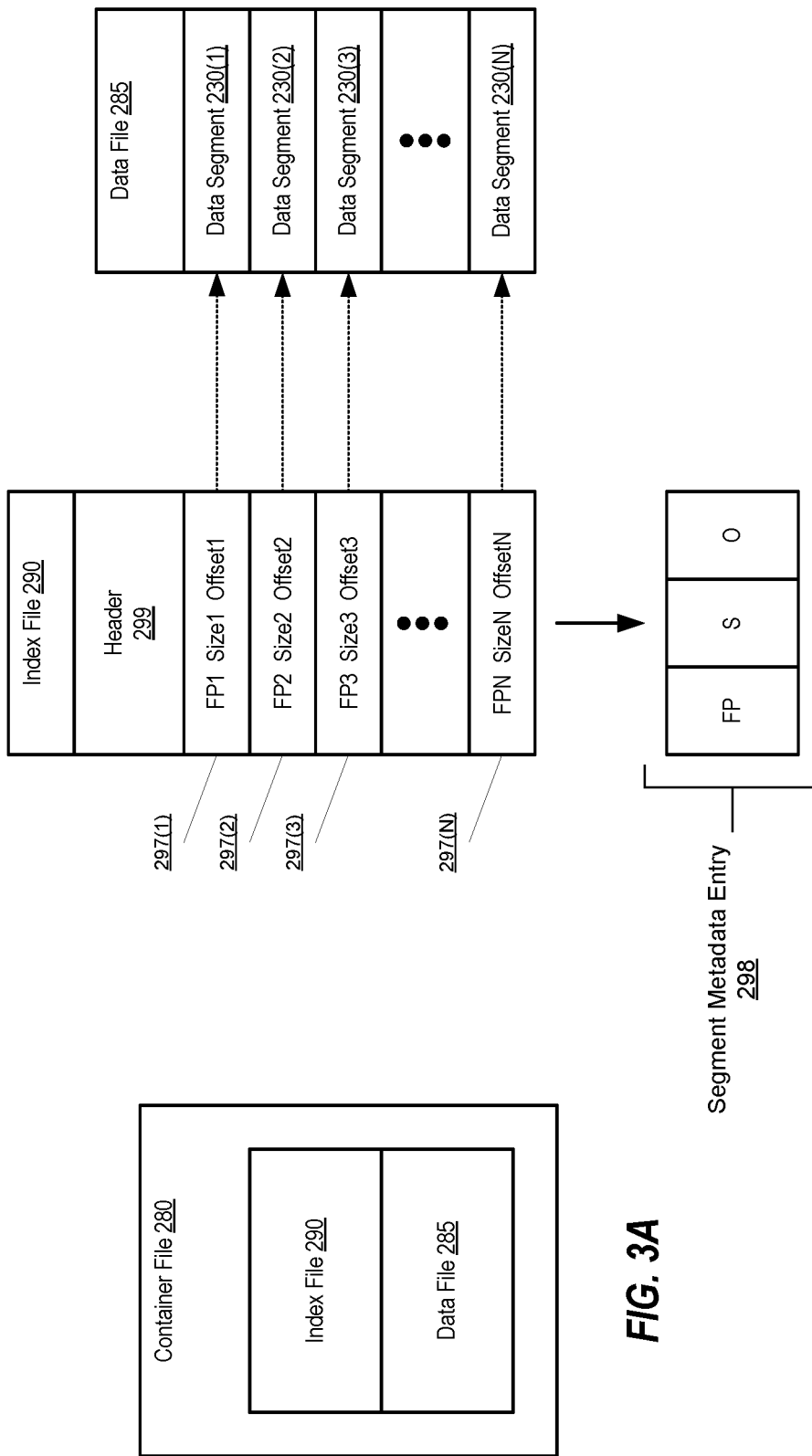
FIG. 3B is a simplified block diagram illustrating an example of the composition of index file, according to methods and systems such as those disclosed herein.
Figure 3A:
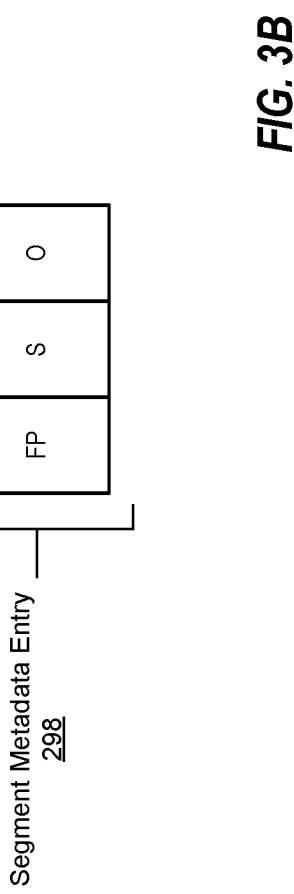
FIG. 3A is a simplified block diagram illustrating an example of the composition of a container, according to methods and systems such as those described herein.

FIG. 3A is a simplified block diagram illustrating an example of the composition of container file 280, which, according to one or more embodiments, allows a backup operation to reference multiple fingerprints representing the data segments that make up a given data construct, such as a file. At the beginning of an initial backup operation, new data segments are written into the given container files (e.g., a container such as container file 280). At the end of the initial backup operation, a data object is stored in the newly-created container file. The data object can contain, for example, the following information: <fp1, size1, containerID1>, <fp2, size2, containerID2>, and so on. A data object typically corresponds to a backup image that includes the data segments to be backed up during a full or incremental backup operation. As will be also appreciated in light of the present disclosure, a data object may be represented by a fingerprint that is the hash value of the data object content.

According to one embodiment, at the beginning of a backup operation from the same client and/or backup policy that performed and/or requested the initial backup operation, data objects that include fingerprints of the last full backup operation (in this example, the initial backup operation) can be retrieved from container file 280. Data segments (or other data storage constructs, as noted) in the new backup operation are fingerprinted (e.g., using fingerprint generation module 250) and looked up within fingerprints from the last full backup operation (e.g., fingerprints 215(1)-(N) in fingerprint cache 240).

If a given fingerprint is not among fingerprints 215(1)-(N) in fingerprint cache 240, a "cache miss" has occurred, and such as indicated (thereby indicating that one or more fingerprints thus generated were not present in the last full backup operation). That being the case, such fingerprints are looked up in a fingerprint index cache, which, in certain embodiments, is a centralized fingerprint index cache such as that depicted in connection with FIG. 2B. In certain embodiments, if the fingerprints are not found in such a central fingerprint index cache, the fingerprints are inserted into the central fingerprint index cache. Future backup operations can then reference fingerprints from both the last full backup operation (e.g., an initial backup operation) and the new backup operation.

In some embodiments, such a central fingerprint index cache is maintained by a deduplication server. In such a scenario, the central fingerprint index cache includes at least part of the entire set of fingerprints that exist in the deduplication system and includes fingerprints generated by a fingerprinting algorithm such as that described previously herein. Although future backup operations can reference fingerprints from the previous backup operations, the central fingerprint index cache will typically not maintain copies of all the fingerprints making up fingerprints 215(1)-(N) because, in this example, fingerprint cache 240 is implemented on an SSD. While such an implementation provides faster fingerprint retrieval and lookup functions, such a storage technology does not typically provide enough storage to store all the fingerprints associated with the various data segments in the previous backups. Therefore, index file 290 is needed, to ensure that future backup operations can reference index file 290 (rather than having to store all such fingerprints in fingerprint cache 240).

FIG. 3B is a simplified block diagram illustrating an example of the composition of index file 290 and data file 285, according to one or more embodiments. That being the case, index file 290 can be seen to include a number of metadata entries (depicted in FIG. 3B as metadata entries 297(1)-(N), and referred to in the aggregate as metadata entries 297), which, in turn, include: <FP1, size1, offset1>, <FP2, size2, offset2>, and so on, where FP1 represents fingerprint 211(1), FP2 represents fingerprint 211(2), and so on. Metadata entries 297 are shown in an example as a segment metadata entry 298, which includes a fingerprint, a data segment size, and a data segment offset within data file 285. While metadata entries 297 are depicted as including such information, additional information (e.g., compression/encryption flags, a checksum, other data references, and/or other relevant information pertinent to the data stored in data file 285). Index file 290 also includes a header 299, which can be used to maintain information regarding the aforementioned metadata entries. As is shown in FIG. 3B, the size and offset information, associated with each of the fingerprints, serves as an index to a data segment in data file 285 to which the given fingerprint corresponds.

In some embodiments, index file 290 includes a number of data object records, each of which may include, in addition to the foregoing, a unique identifier (UID) list, which may list one or more UIDs of file records in catalog 295, as described subsequently in connection with FIG. 4. When a file's data is to be inserted in the catalog (e.g., as part of a backup operation), a file record is created with a UID for the file and fingerprint for the data of the file. In such embodiments, the given UID can be inserted into the data object record that has the data fingerprint in question (i.e., the fingerprint of the data object storing some or all of the file data of the inserted file). When a file record is removed (e.g., in response to a request from a source computer), the UID of that file record is also removed from the corresponding data object record. Thus, in such embodiments, the UID list of a data object record uniquely identifies each file to which file data corresponds.

Figure 3C:
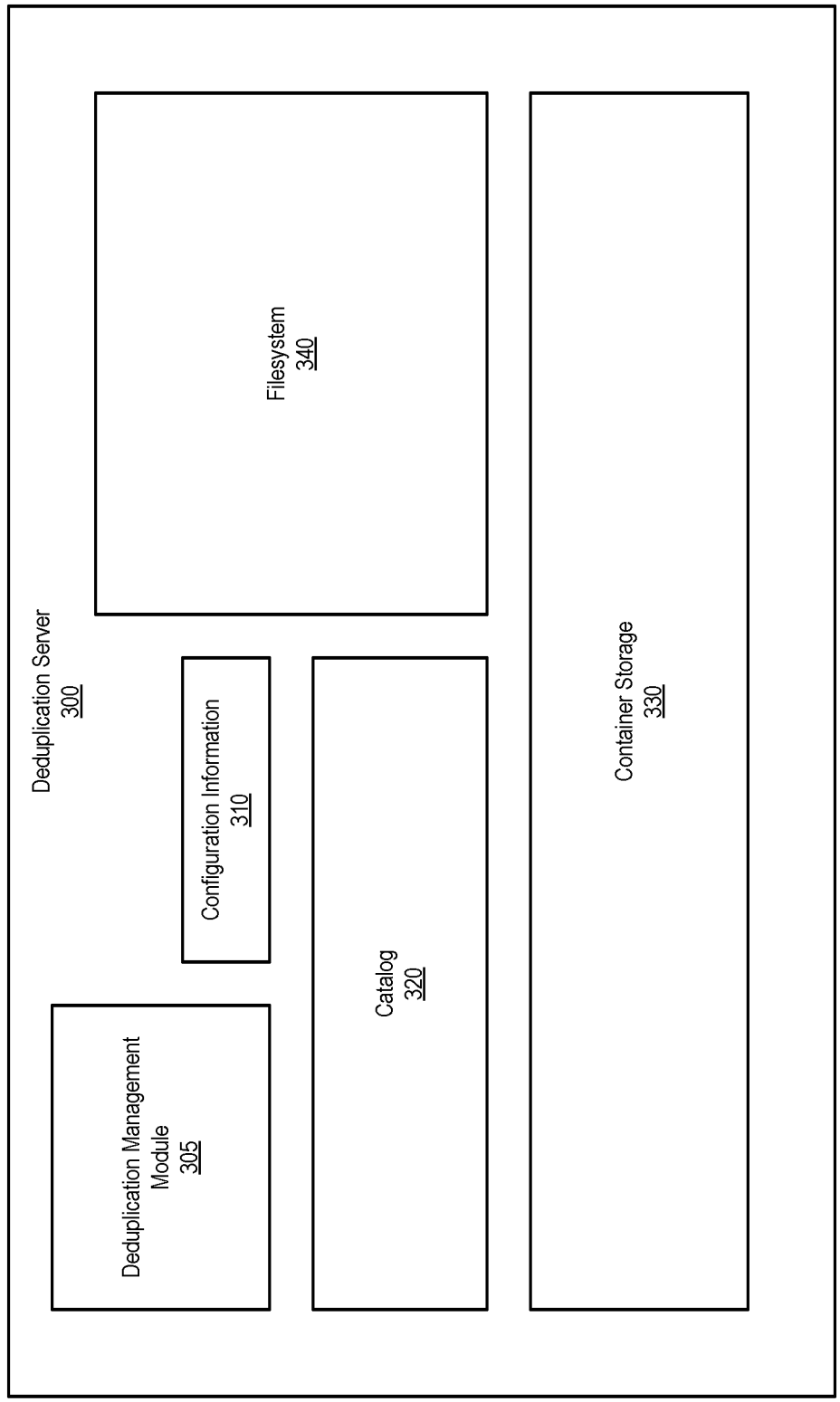
FIG. 3C is a simplified block diagram illustrating an example of a deduplication system, according to methods and systems such as those disclosed herein.

FIG. 3C is a simplified block diagram illustrating an example of a deduplication system that provides a user-accessible storage area, according to methods and systems such as those described herein. That being the case, FIG. 3C depicts one embodiment of a deduplication server 300, in the manner of deduplication server 140 of FIG. 1. Deduplication server 300 includes a deduplication management module 305 (e.g., in the manner of deduplication management module 296, described earlier in connection with FIG. 2B), which manages and maintains a variety of information, including, in the depicted embodiment, configuration information 310, catalog information 320 (in the manner of catalog 295 described previously), and container storage 330 (in the manner of containers 280 described previously). In the embodiment depicted in FIG. 3C, deduplication server 300 also supports a file system 340. Despite existing in the storage of deduplication server 300, file system 340 can be accessed from other computing systems (e.g., client systems 110), by users of such other computing systems, in the manner of file systems local to those computing systems. Such can be accomplished using, for example, protocols such as NETWORK FILE SYSTEM (NFS), SERVER MESSAGE BLOCK (SMB), COMMON INTERNET FILE SYSTEM (CIFS), or the like. In providing such access, filesystem 340 can provide deduplicated storage for user data in a manner that appears to users as typical filesystem storage.

Figure 4:
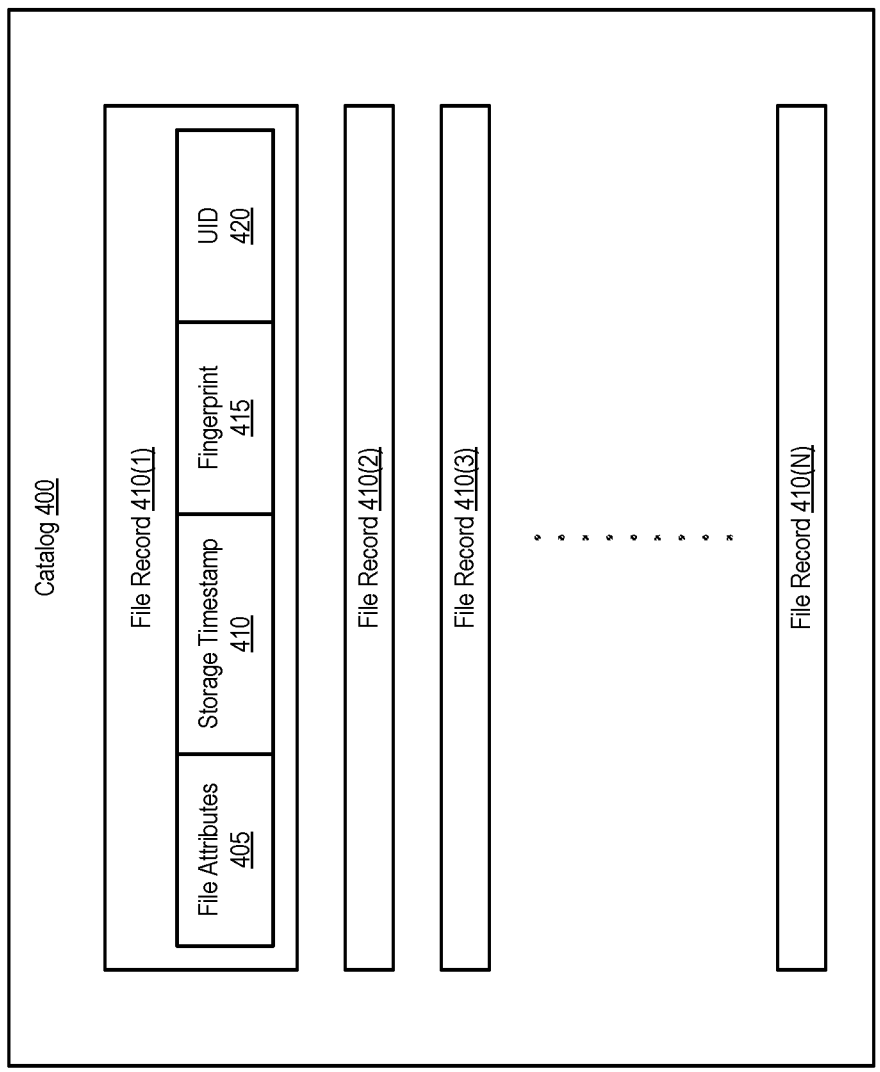
FIG. 4 is a simplified block diagram illustrating an example of a file record, according to methods and systems such as those disclosed herein.

FIG. 4 is a simplified block diagram illustrating an example of a catalog, according to embodiments of methods and systems such as those disclosed herein. According to the illustrated embodiment, one or more file records can be stored in a catalog such as catalog 295 (a comparable construct being illustrated in FIG. 4 as a catalog 400), and is illustrated in FIG. 4 as being among a number of such file records (depicted in FIG. 4 as file records 410(1)-(N), or in their entirety, as file records 410). Using file record 410(1) as an example, it can be seen that FIG. 4 depicts file record 410(1) as including one or more file attributes 405, a storage timestamp 410, a fingerprint 415, and a unique identifier (UID) 420. In various embodiments, a file record may include fewer and/or additional details and/or various other pieces of information. As noted with regard to the storage units described earlier herein, container storage 500 can store container files in one or more modifiable storage locations, and subsequently move full containers to immutable storage locations (e.g. under the control of deduplication management module such as that described earlier herein).

In certain embodiments, file attributes 405 includes a number of attributes of the corresponding file (e.g., filename, path, size, owner, modification/access history, permissions, and so on, as relates to the file in question). Storage timestamp 410 may include an indication of when the file record was created or last updated, for example. In certain embodiments, data fingerprint 415 includes fingerprint information that effectively uniquely identifies the data in the corresponding file, such that two files with the same data portion will have the same data fingerprint and two files with different data portions will have different fingerprints. For example, the data fingerprint may be derived by applying one or more hash functions to the data portion of the corresponding file, as noted earlier. Various other methods for calculating data fingerprints can be used to calculate data fingerprints, as also noted earlier. According to the illustrated embodiment, file record 410(1) also includes unique identifier (UID) 420 for the corresponding file. UID 420 may uniquely identify the file corresponding to file record 410(1) using various techniques, including those described in connection with the generation of fingerprints such as those associated with the data segments described elsewhere herein. In certain embodiments, catalog 400 includes a path object (PO, as noted) corresponding to each data object group in the catalog.

Figure 5:
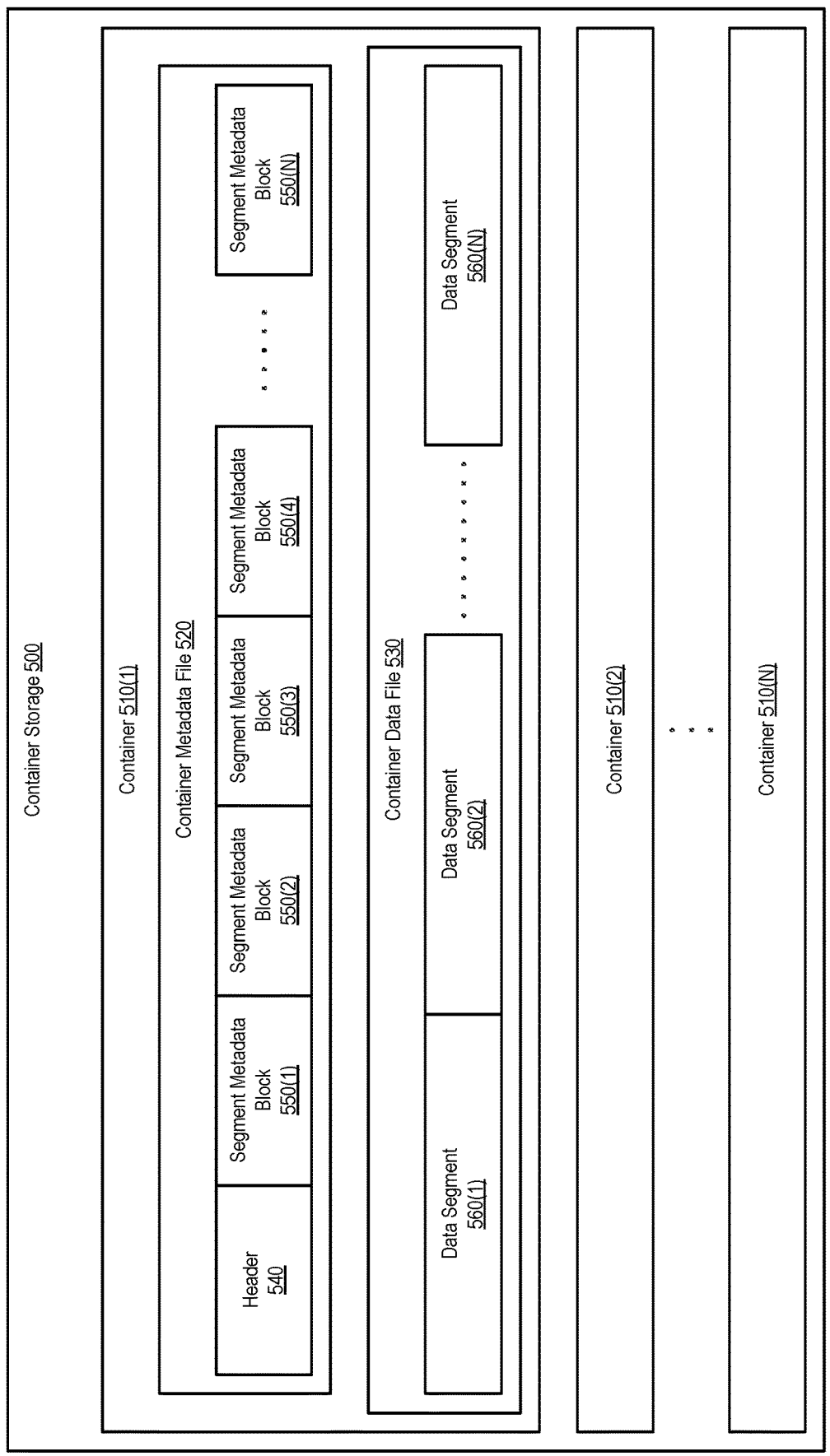
FIG. 5 is a simplified block diagram illustrating an example of container storage and containers therein, according to methods and systems such as those described herein.

FIG. 5 is a simplified block diagram illustrating an example of container storage, according to methods and systems such as those described herein. FIG. 5 thus depicts an example of container storage 330 as container storage 500 and, in so doing, provides greater detail as to the information stored therein. Container storage 500 provides for the storage of a number of containers (depicted in FIG. 5 as containers 510(1)-(N), and referred to in the aggregate as containers 510). While container storage 500 is depicted in FIG. 5 in a conceptual manner, in one embodiment, each of containers 510 can be implemented as one or more files in a file system such as those noted previously herein. Further detail is provided in connection with container 510(1). Container 510(1) is depicted as including a container metadata file 520 and a container data file 530. Container metadata file 520, in turn, includes a header 540 and some number of segment metadata blocks (depicted in FIG. 5 as segment metadata blocks 550(1)-(N), and referred to in the aggregate as segment metadata blocks 550). As will be appreciated in light of the present disclosure, segment metadata blocks 550 are comparable in content and structure to metadata entries 297(1)-(N), and are intended to be interchangeable therewith. Container data file 530 includes a number of data segments (depicted in FIG. 5 as data segments 560(1)-(N), and referred to in the aggregate as data segments 560).

Example Deduplication System Processes for Employing Immutable Storage

Figure 6:
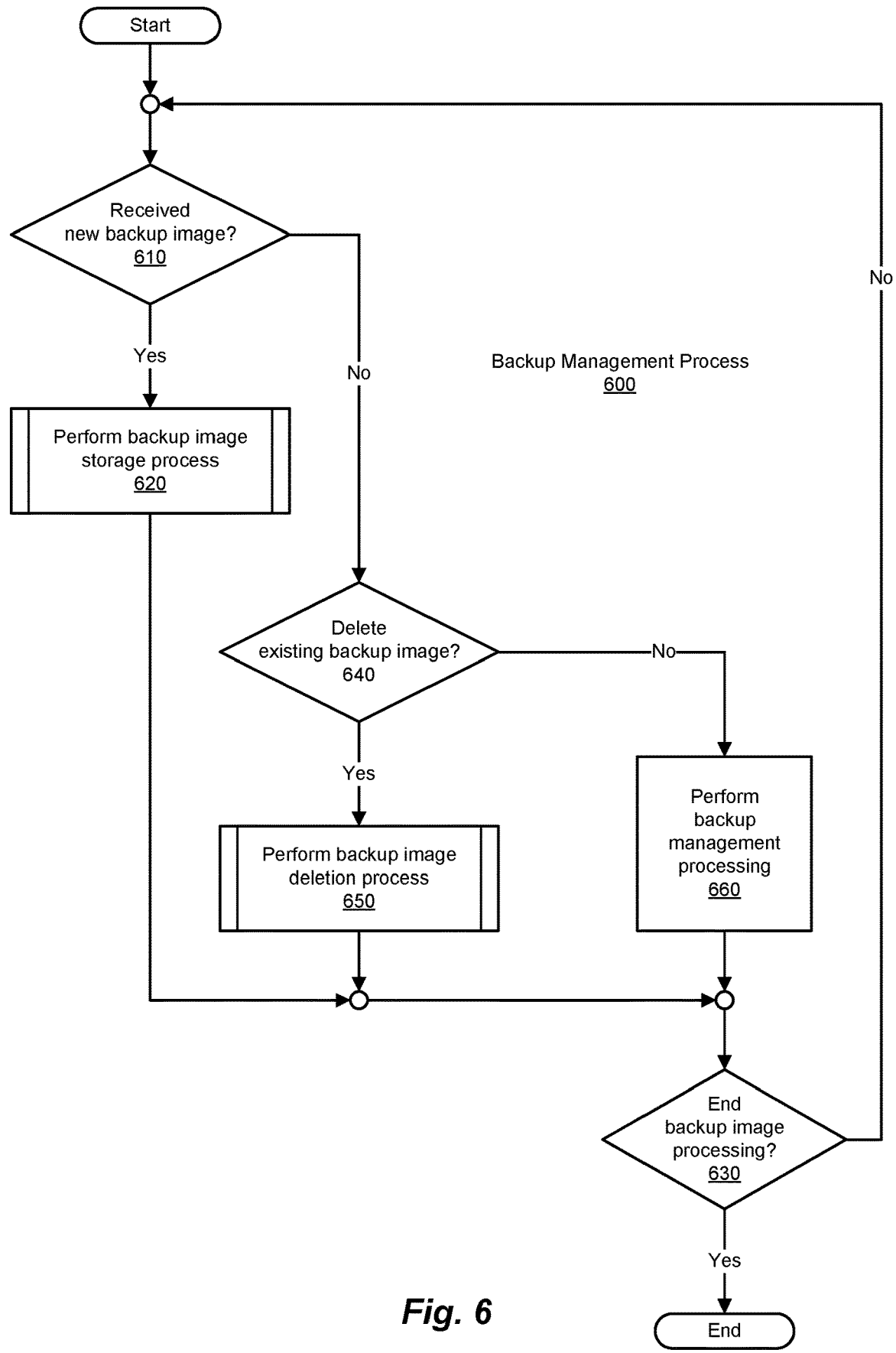
FIG. 6 is a flow diagram illustrating an example of a backup management process, according to methods and systems such as those described herein.

FIG. 6 is a flow diagram illustrating an example of a backup management process, according to methods and systems such as those described herein. That being the case, a backup management process 600 is depicted. Backup management process 600 begins with a determination as to whether a new backup image has been received (610). It will be appreciated that backup management process 600 can be implemented, for example, in a deduplication management module such as the deduplication management modules described earlier.

In the case in which a new backup image has been received, backup management process 600 performs a backup image storage process (620). An example of such a backup image storage process is described in connection with FIGS. 7A and 7B, subsequently. A determination is then made as to whether backup image processing should conclude (630). In the case in which further backup image processing is to be performed, backup management process 600 continues to the receipt of a new backup image (610) (or other operations of backup management process 600 performed). In the alternative, backup management process 600 concludes.

If a new backup image has not been received, a determination is made as to whether an existing backup image is to be deleted (640). As will be appreciated from the present disclosure, the deletion of a backup image is intended to comprehend the expiration of a backup image, the intentional deletion of a backup image, and other such operations, as may be executed at a point in time at which a given backup image is no longer needed/desired. If an existing backup image is to be deleted, a backup image deletion process is performed (650). An example of such a backup image deletion process is described in connection with FIG. 8, subsequently. As before, a determination is then made as to whether backup image processing should conclude (630). In the case in which further backup image processing is to be performed, backup management process 600 continues to the receipt of a new backup image (610) (or other operations of backup management process 600 performed). In the alternative, backup management process 600 concludes.

In the case in which a new backup image has not been received (16) and any existing backup image is not being deleted (640), one or more backup management operations can be performed (660). Such operations can include modifications to retention periods, container parameter changes, changes to storage types, maintenance, and other operations as may be necessary and appropriate to the proper functioning of the backup management system in question. Once such operations been performed, a determination is then made as to whether backup image processing should conclude (630). In the case in which further backup image processing is to be performed, backup management process 600 continues to the receipt of a new backup image (610) (or other operations of backup management process 600 performed). In the alternative, backup management process 600 concludes.

Figure 7A:
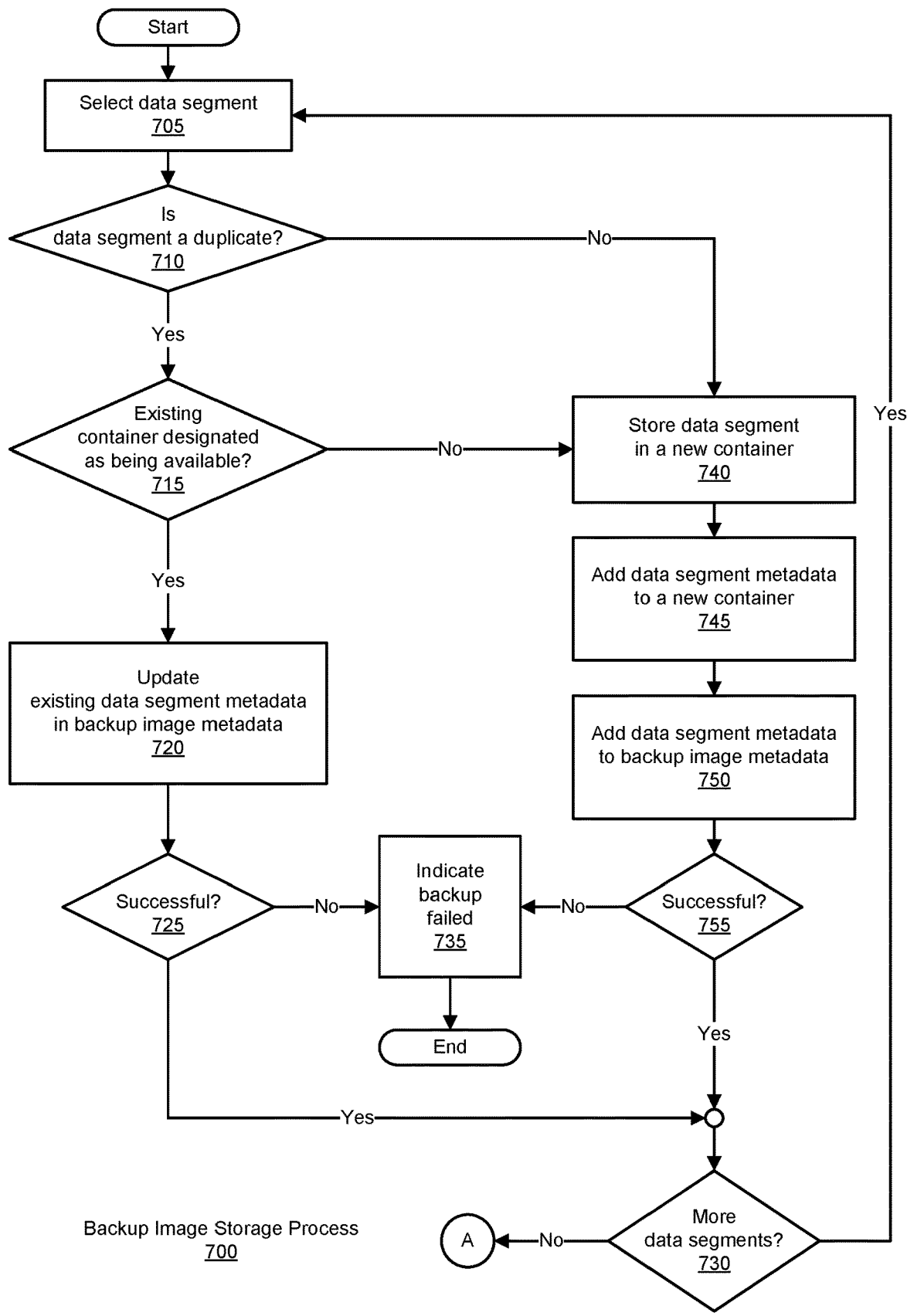
FIGS. 7A and 7B depict a flow diagram illustrating an example of a process for performing a deduplicated backup operation, according to methods and systems such as those described herein.
Figure 7B:
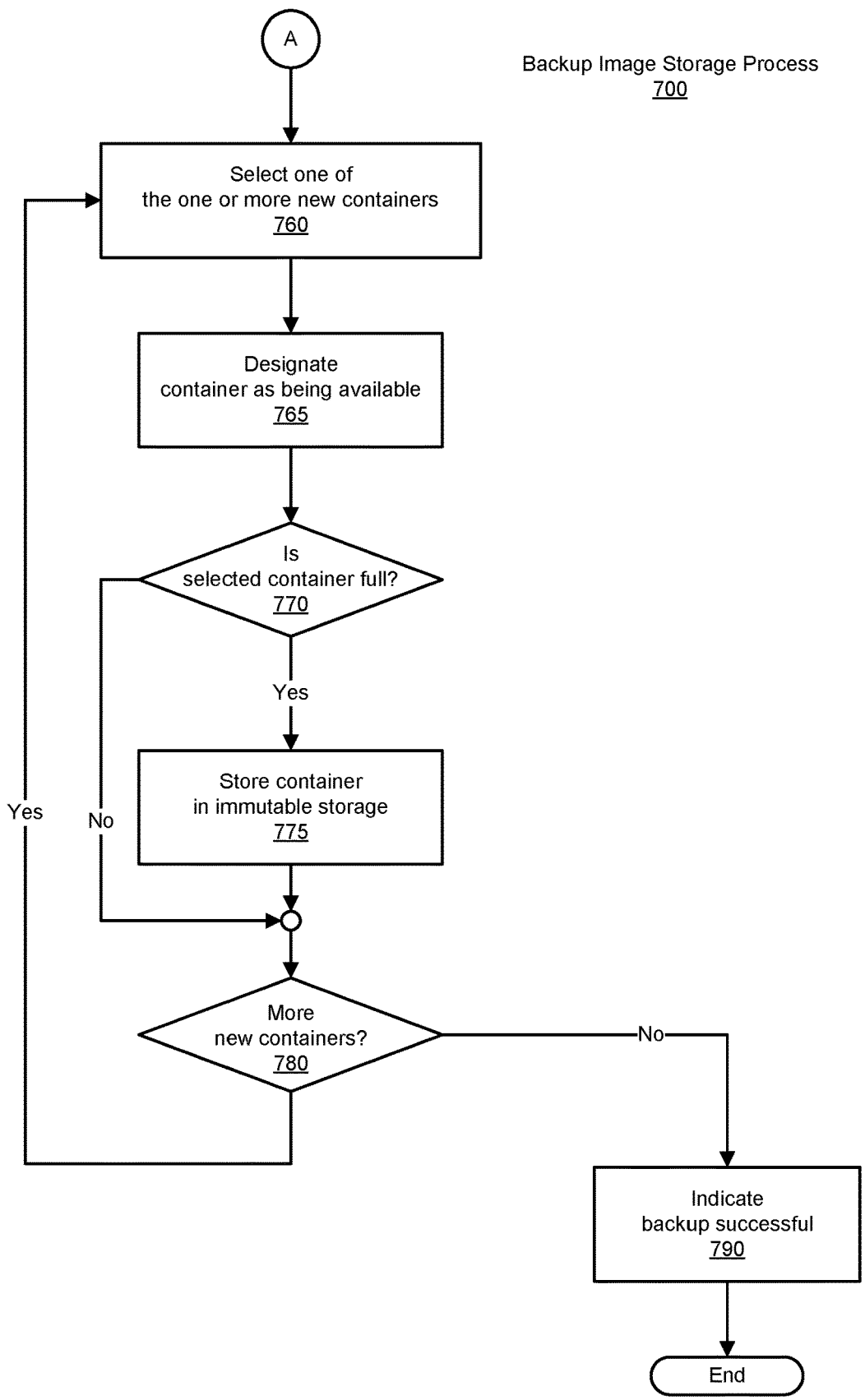

FIGS. 7A and 7B depict a flow diagram illustrating an example of a process for performing a deduplicated backup operation, according to methods and systems such as those described herein. That being the case, a backup image storage process 700 is depicted. Backup image storage process 700 begins with the receipt of an indication that a deduplicated backup is to be performed (not shown). If no such event has occurred, backup image storage process 700 awaits the occurrence of such an event. In response to a determination that a backup operation is to be performed, the data that is the subject of the backup operation is divided into a number of data segments. Each of these data segments can be represented by a fingerprint, as noted. To allow the present discussion to focus on the salient features of the embodiments described herein, backup image storage process 700 depicts a simpler deduplication process then might otherwise be implemented. For example, caching of fingerprints at a client or server can be implemented, as can a number of techniques directed to improving backup operation performance.

With that in mind, backup image storage process 700 begins with the selection of one of the data segments to be backed up (705). A determination is then made as to whether the data segment in question is a duplicate (710). If the data segment in question is a duplicate (and so, a duplicate data segment has already been stored), a determination is made as to whether the existing container is designated as being available (715). As used herein, the terms "available" and "unavailable" are used simply to indicate whether the data segments of the given container can, in view of embodiments such as those described herein, can be appropriately referenced by one or more backup images (e.g., in view of the state of the container as stored in immutable storage). As will be appreciated, the question of availability applies to containers stored in immutable storage, where a lingering reference could result in the unwanted and inefficient maintenance of one or more containers holding large amounts of "garbage" data (expired or otherwise deleted data segments) in immutable storage. In backup image storage process 700, the determinations described below are directed to addressing the question of the referencing of duplicate data segments that exist in the unexpired/undeleted portions of containers stored in immutable storage. As will be further appreciated, in light of the present disclosure, duplicate data segments identified in containers not stored in immutable storage can simply be referenced in the backup image in a fashion comparable to that employed in situations in which the duplicate data segments are identified as being stored in available containers in immutable storage. Further still, when a container is designated as being unavailable, the deduplication management system will typically request data from the client in question, in order to obtain the data for storage in a modifiable container (which will then be stored in immutable storage at some point).

If the existing container, in which the duplicate data segment is stored, is available, backup image storage process 700 proceeds with updating the existing data segment metadata in the backup image metadata (720). If this process is successful (725), a determination is made as to whether more data segments of the backup image remain to be deduplicated (730). In the alternative, if the update operation is unsuccessful, an indication is made that the backup failed (735), and backup image storage process 700 concludes.

In the case in which the data segment is not a duplicate (710) or the existing container is not designated as being available (i.e., the container in question is unavailable) (715), the data segment in question is stored in a new container (740). It will be appreciated that, in view of the present disclosure, what is referred to herein as a "new container" is a container that has not been stored in immutable storage, and so is in reference to this aspect of storage and is not intended to imply the creation of a new container at any particular operation. That being the case, an existing container can be a container that is been stored in immutable storage and designated as available (and so available to be referenced), or can be a container that is not yet been stored in immutable storage. The data segment's data segment metadata (segment object) is added to the new container (745) and to the backup image's metadata (750). In a fashion comparable to that just discussed, a determination is made as to whether the foregoing operations were successful (755). If this process is successful (755), a determination is made as to whether more data segments of the backup image remain to be deduplicated (730). In the alternative, if the update operation is unsuccessful, an indication is made that the backup failed (735), and backup image storage process 700 concludes.

In performing the foregoing steps, backup image storage process 700 may create one or more new containers. That being the case, once the backup image's data segments have been processed in the aforementioned fashion, backup image storage process 700 proceeds via connector "A," to the selection of one of the one or more new containers (760), as depicted in FIG. 7B. Having selected one of the one or more new containers (and assuming such new containers were needed), backup image storage process 700 designates the selected container as being available (765). As will be appreciated in light of the present disclosure, the designation of the selected container as being available can be done in the deduplication system's catalog, in another data structure in the deduplication system, or elsewhere. Further in this regard, the designation could be sent to another module (e.g., off-site backup management software, in place of or in combination with local storage).

A determination is then made as to whether the selected container is full (770). If the selected container is full, the selected container is stored in immutable storage (775). As will be appreciated in view of backup image storage process 700, the container in question (the selected container) may not be full, in which case, that container remains available to have additional data segments written thereto. Such might be the case, where only a comparatively small number of unique data segments (and so, data segments that were not already stored in an available container, for example) needed to be stored in the given container. In such a situation, that container would remain available to subsequent backup images for the storage of unique data segments.

Once the selected container has been designated appropriately, and possibly stored in immutable storage, backup image storage process 700 iterates to the selection of the next of the new containers (780). Backup image storage process 700 continues to iterate in this fashion until the one or more new containers have been processed. Once the one or more new containers have been processed, backup image storage process 700 proceeds to making an indication that the backup was successful (790). Backup image stored process 700 then concludes.

Figure 8:
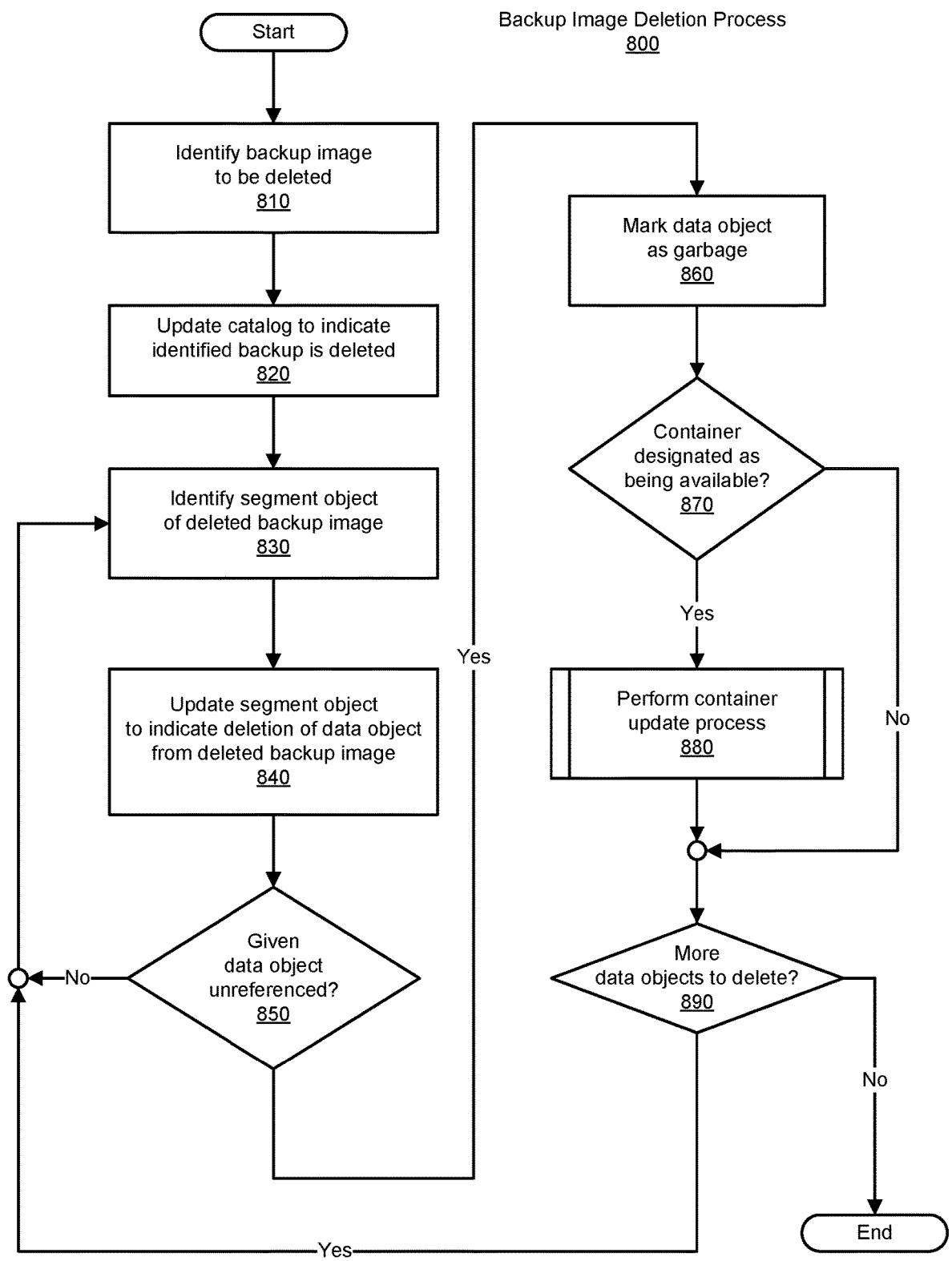
FIG. 8 is a flow diagram illustrating an example of a backup image deletion process, according to methods and systems such as those described herein.

FIG. 8 is a flow diagram illustrating an example of a backup image deletion process, according to methods and systems such as those described herein. That being the case, FIG. 8 depicts a backup image deletion process 800. In the example depicted, backup image deletion process 800 begins with the identification of the backup image to be deleted (810). The catalog in which information regarding the backup image is maintained is updated to indicate that the identified backup is being deleted (820). As has been noted, the process of deleting a backup image described herein is intended to comprehend not only the deletion of a given backup image, but also its expiration and/or other scenarios in which the backup image is no longer needed/desired.

Backup image deletion process 800 then proceeds with the identification of segment objects belonging to the identified backup image. This portion of backup image deletion process begins with the identification of one of the deleted backup image's segment objects being identified (830). The identified segment object is updated to indicate deletion of the data object from the deleted backup image (840). A determination is then made as to whether the segment object's being updated (e.g., the given data object being dereferenced) has resulted in the given data object becoming unreferenced (850). If the data object in question is still referenced by one or more backup images, backup image deletion process 800 iterates to the identification of the next segment object of the deleted backup image to be processed (830). In the alternative, backup image deletion process 800 proceeds with designating the given data object as being "garbage" (and in so doing, indicating that the data segment in question has been deleted, expired, or is otherwise no longer needed/desired) (860). As noted, the term garbage comprehends the expired portion(s) of a container, and represents, in certain embodiments, the amount of data/metadata that is no longer referenced (e.g., as a result of the backup image(s) referencing the data segments having been deleted). Further in this regard, it is to be appreciated that, in certain embodiments, the distinction between an expired container and a deleted container can be viewed in terms of the expired container simply being deleted at the end of a period of time (e.g., a retention period).

A determination is then made as to whether the container being deleted is designated as being available (870). If the container being deleted is designated as being available, backup image deletion process continues to performing a container update process (880). An example of such a container update process is described in connection with FIG. 9, subsequently. Such a container update process makes a determination as to whether or not the container in question should remain available (and so, remain available to be referenced by subsequent backup images). Such a determination can be made based on static criteria (e.g., once a container becomes unavailable for further referencing, the container remains in the unavailable state until such time as the container is deleted, for example, at the end of a retention period). Such a process can also be made dynamic, where in a given set of circumstances a container is unavailable to be referenced, but subsequently, the circumstances having changed, the container might once again be designated as being available.

A determination is then made as to whether further data objects remain to be deleted as part of the deletion of the backup image in question by backup image deletion process and relate hundred (890). In the case in which more data objects remain, backup image deletion process 800 iterates to the identification of the next segment object of the deleted backup image to be processed (830). In the alternative, the data segments of the backup image (references thereto) having been processed, backup image deletion process 800 concludes.

Figure 9:
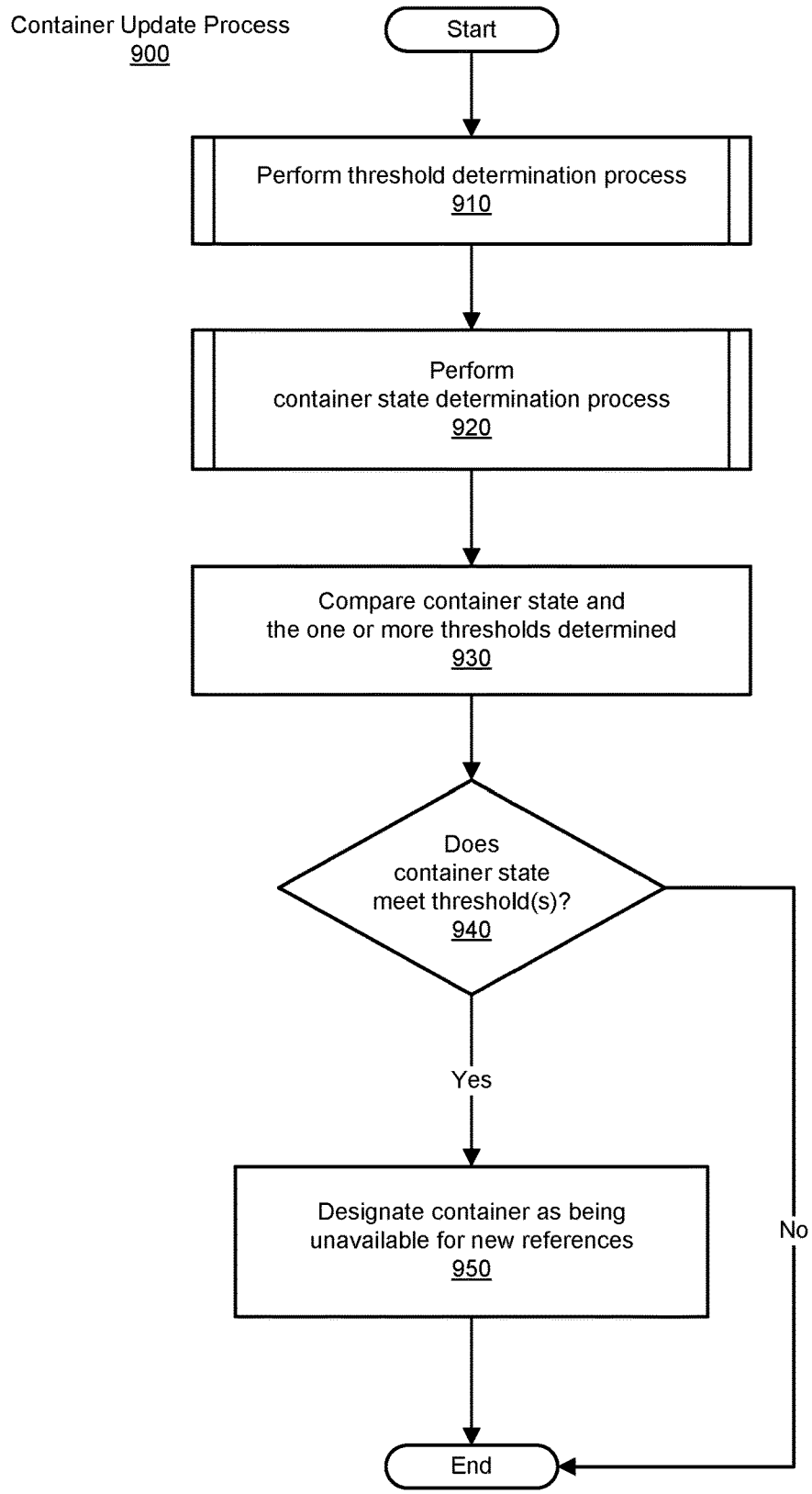
FIG. 9 is a flow diagram illustrating an example of a container update process, according to methods and systems such as those described herein.

FIG. 9 is a flow diagram illustrating an example of a container update process, according to methods and systems such as those described herein. FIG. 9 thus depicts a container update process 900. Container update process 900 begins by performing a threshold determination process (910). An example of such a threshold determination process is described in connection with FIG. 10A, subsequently. As part of container update process 900, a container state determination process is also performed (920). An example of such a container state determination process is described in connection with FIG. 10B, subsequently.

Results of the container state determination process and the one or more thresholds determined by the threshold determination process are then compared (930). Based on this comparison, a determination is made as to whether the container's container state meets the one or more thresholds thus determined (940). As used herein, the term "meet" is intended to comprehend any relational inequality, including less than a greater than, less than or equal to, greater than or equal to, substantially equal to, and other such relationships. In certain embodiments, such a comparison is between a garbage space percentage of the container in question (the percentage of the container's storage that is filled with "garbage") and the retention time percentage (a relationship between the retention period of the given container versus that of a new container). Such relationships are described in greater detail elsewhere herein. As noted earlier, the term garbage is intended to represent the amount of data/metadata that is no longer referenced (e.g., as a result of the backup image(s) referencing the data segments having been deleted).

If the one or more thresholds are met by the container's container state, the container in question is designated as being unavailable (unavailable to be referenced by subsequent backup images, e.g., by way of new references thereto) (950). Otherwise, container update process 900 proceeds without changing the designation of the container in question. In either case, container update process 900 then concludes.

Figure 10A:
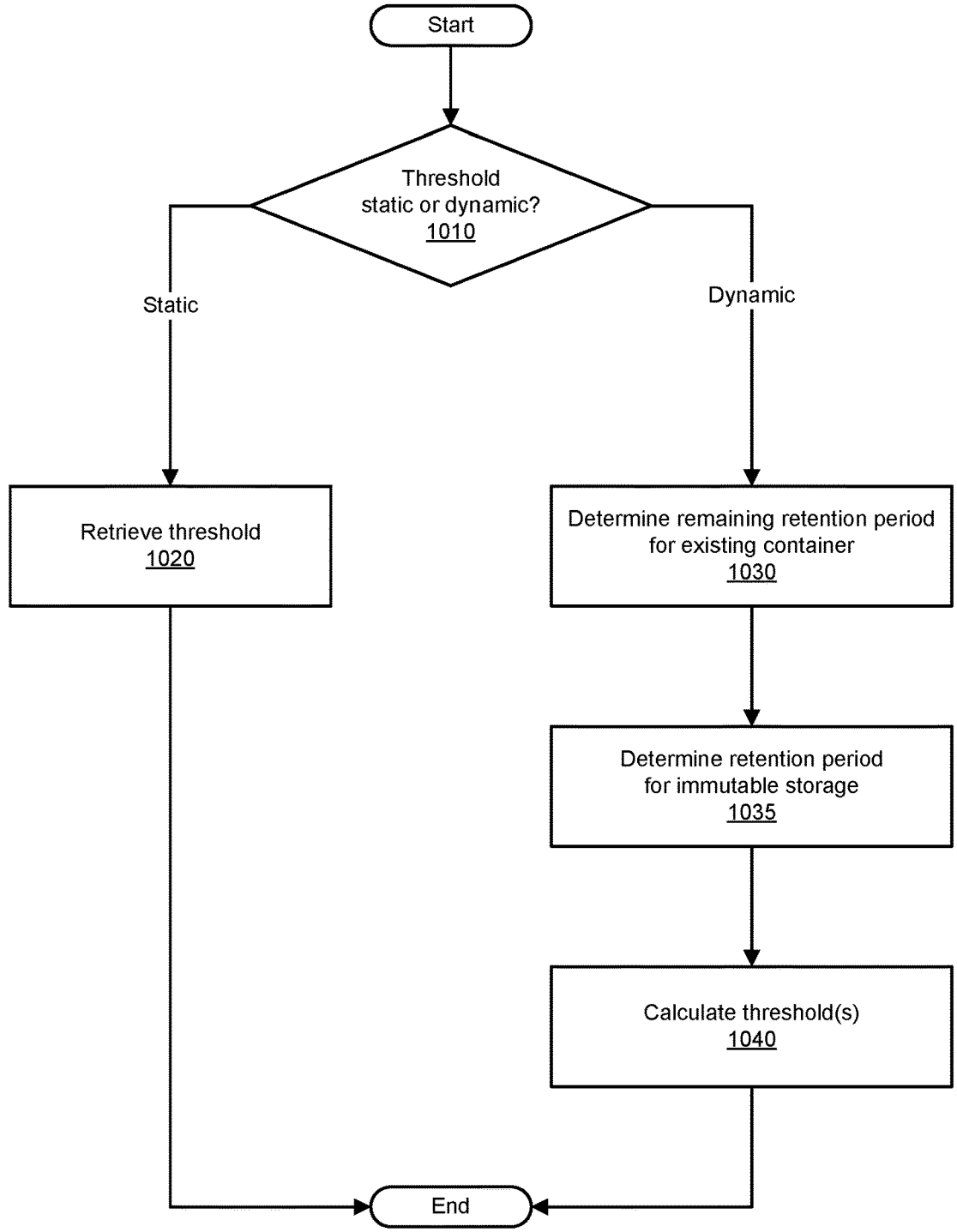
FIG. 10A is a flow diagram illustrating an example of a threshold determination process, according to methods and systems such as those described herein.

FIG. 10A is a flow diagram illustrating an example of a threshold determination process, according to methods and systems such as those described herein. FIG. 10A thus depicts a threshold determination process 1000, which begins with a determination as to whether the one or more thresholds to be determined are static or dynamic (1010). While threshold determination process 1000 is depicted as performing either a static determination or a dynamic determination, it will be appreciated that, in light of the present disclosure, that a combination of static and dynamic determinations can be made. For example, a static determination can be made as an initial determination, in order to quickly identify containers that meet a baseline condition with regard to each container's garbage space percentage (a more efficient comparison to make), and only for those containers not meeting the static determination would a dynamic determination be performed (taking into consideration, for example, changes in container state, system state, changing retention periods, and other such factors). In so doing, the efficiency with which containers are analyzed by embodiments such as those described herein can be considered.

In the case in which one or more static thresholds are to be determined, threshold determination process 1000 retrieves such static thresholds (1020). Such static thresholds can be based, for example, on empirical evidence such as historical results of differing garbage space percentages, container usage, backup frequency, and other such considerations. Further, it is to be appreciated that the determination of such static thresholds can result in those thresholds changing over time. As such, a distinction between such static thresholds and dynamic threshold such as those described below is the differences in factors considered and the time at which such factors are considered.

In the case in which one or more dynamic thresholds are to be determined, threshold determination process 1000 proceeds with determining the amount of time remaining in the existing container's retention period (referred to herein as the remaining retention period) (1030). Also determined as part of threshold determination process 1000 is the retention period for the immutable storage in which the containers are (or are to be) (1035). As will be appreciated, the retention period for the immutable storage can differ from one container to another, but for the sake of simplicity in this discussion, will be considered to be a static number related to the immutable storage in which the containers are stored. The effects of containers having different retention periods can be accounted for in threshold determination process 1000 by using the given container's retention period when determining the retention time percentage as a threshold, for example.

Using the foregoing information and/or other such information, the one or more thresholds (e.g., the retention time percentage for the container, the immutable storage, or the like) are then calculated (1040). As noted earlier herein, such calculations can result in a retention time percentage for the existing container. In either case, threshold determination process 1000 then concludes.

Figure 10B:
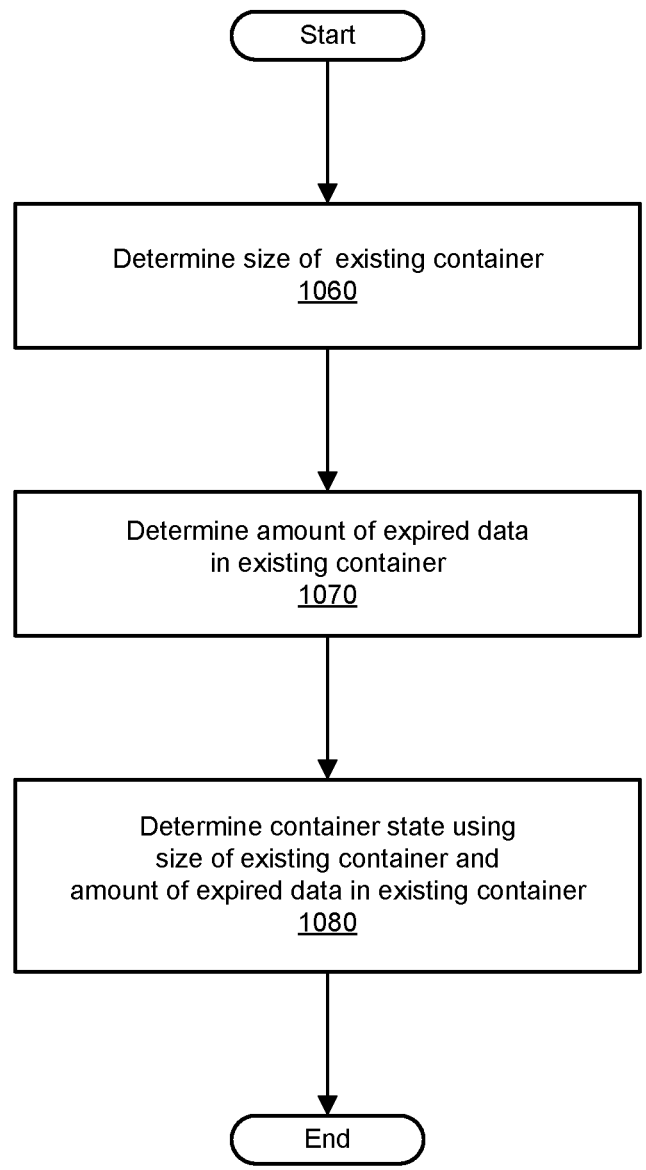
FIG. 10B is a flow diagram illustrating an example of a container state determination process, according to methods and systems such as those described herein.

FIG. 10B is a flow diagram illustrating an example of a container state determination process, according to methods and systems such as those described herein. FIG. 10B thus depicts a container state determination process 1050. Container state determination process 1050 begins with the determination of the storage size of the existing container (1060). The amount of expired data stored in the existing container is then determined (1070). The container's container state is then determined, using, for example, the storage size of the existing container and the amount of expired data stored in the existing container, among other possible parameters (1080). In so doing, the existing container's state (e.g., garbage space percentage) can be determined, in certain embodiments. As will be appreciated in light of the present disclosure, other factors can be considered in determining the existing container's container state including not only the amount of expired data stored in the existing container and that container's storage size, but also factors such as the priority of the data segments stored therein (e.g., as might be the case in view of the importance of the data, policies and/or laws governing the maintenance of such data, and other considerations), the amount of data backed up, the number of such backup images, and other such considerations. Container state determination process 1050 then concludes.

Examples of Backup Storage in Immutable Storage Systems

As noted previously, data deduplication (or more simply, deduplication) is a process that eliminates redundant copies of data and reduces storage and transfer overhead. Deduplication ensures that only one unique instance of data is retained on a storage device. Redundant data blocks are replaced with a pointer to the unique data copy. Source-based deduplication (also called client-side deduplication) removes redundant blocks before transmitting data to a backup target such as a storage device, and can also provide facilities for determining if such data transfer is needed by checking fingerprints against fingerprints maintained by, for example, a backup server and/or a deduplication server. Performing deduplication at the source can reduce bandwidth and storage use.

As also noted, deduplication involves linking references to data content. Although each data segment may be referenced by more than one backup image, storage reclamation can remove data segments in appropriate situations, such as if one or more backups associated with the data segments thus referenced have expired. For example, free space in the given data containers can be compacted to reclaim storage space recently made available, for example, as a result of the deletion of one or more backups resulting from the given backups having expired.

Figure 11:
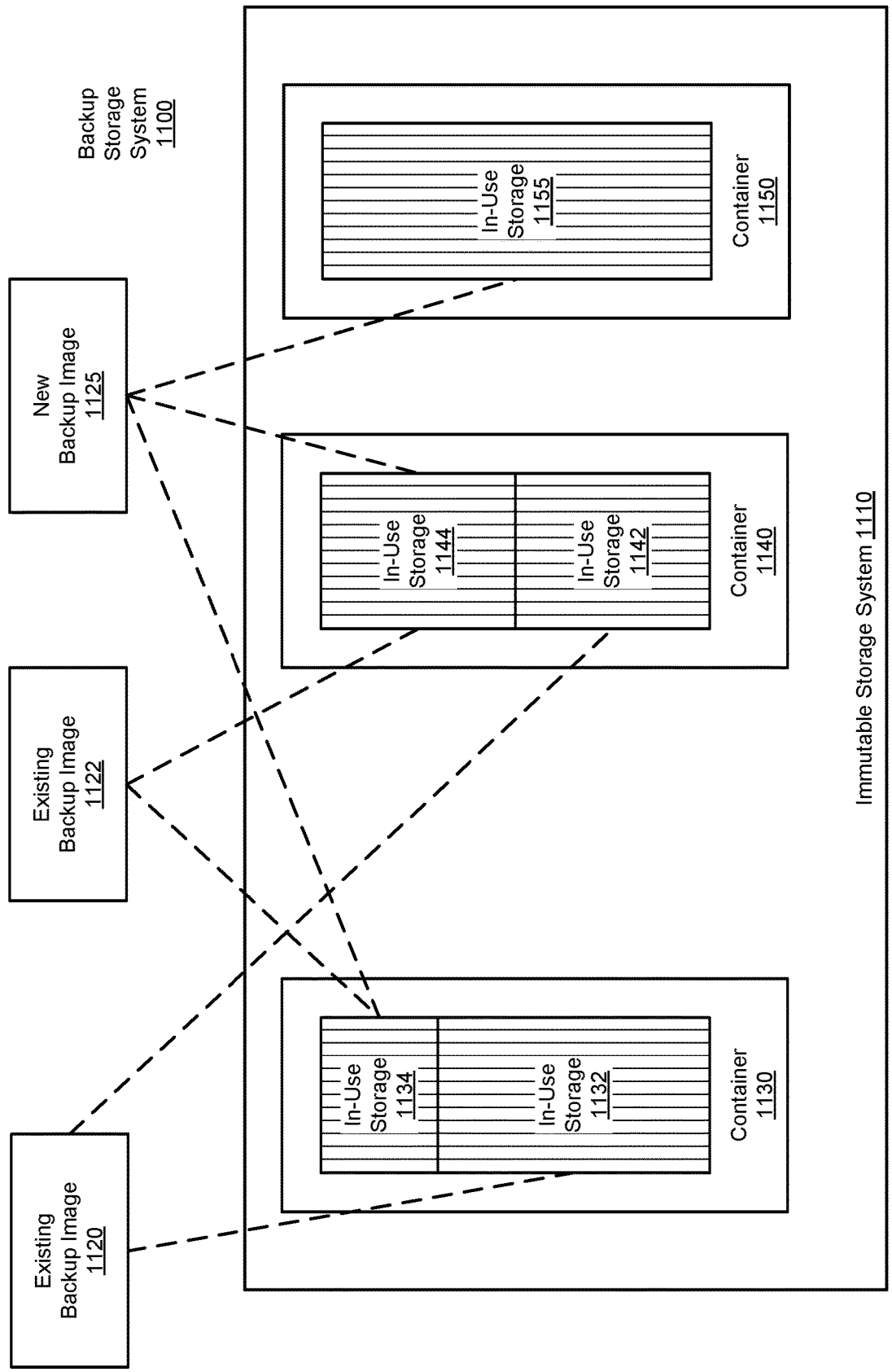
FIG. 11 is a simplified block diagram illustrating an example of a backup storage system. in which containers are stored in immutable storage, according to methods and systems such as those described herein.

FIG. 11 is a simplified block diagram illustrating an example of a backup storage system. in which containers are stored in immutable storage, according to methods and systems such as those described herein. FIG. 11 thus depicts a backup storage system 1100 that includes an immutable storage system 1110. Immutable storage system 1110 stores a number of containers, in which are stored deduplicated data segments for a number of backup images. In this regard, examples of such backup images are depicted in FIG. 11 as existing backup images 1120 and 1122, as well as a new backup image 1125. These backup images reference containers stored in immutable storage system 1110, in which are stored the backup images' deduplicated data segments. Examples of such containers are depicted in FIG. 11 as containers 1130, 1140, and 1150. In FIG. 11, existing backup image 1120 is depicted as referencing deduplicated data segments stored in in-use portions of containers 1130 and 1140 (depicted in FIG. 11 as in-use storage 1132 and in-use storage 1142, respectively). Similarly, existing backup image 1122 is depicted in FIG. 11 as referencing other in-use portions of containers 1130 and 1140 (depicted in FIG. 11 as in-use storage 1134 and in-use storage 1144, respectively). Existing backup image 1125, by contrast, is depicted as referencing in-use portions of containers 1130, 1140, and 1150, such in-use portions being depicted as in-use storage 1134, in-use storage 1144, and in-use storage 1155. It will be appreciated that the manner in which the containers and their use is depicted in FIG. 11 is intended to provide a basis to discuss FIGS. 12-15 (described subsequently) such that garbage data and in-use data can be discussed in terms of whether the amount of each results in availability/unavailability with respect to one or more thresholds. As will be appreciated in light of the present disclosure, such data segments can be intermingled, have resulted from various prior backup images, and so on, and so need not be organized in the manner depicted, or in any particular manner, in fact, given that it is the cost of maintaining the existing container(s) versus the cost of storing data segments anew, that is the question addressed above.

As can be seen in FIG. 11, existing backup image 1120 refers to data segments in containers 1130 and 1140, which might be the case in which existing backup image 1120 referred to these data segments originally. References by existing backup image 1122 two containers 1130 and 1140 may also be original such references. References by new backup image 1125 to containers 1130 and 1140 are, in this example, references to data segments of prior backup images (in this example, data segments originally referred to by existing backup image 1122). As will also be appreciated, new backup image 1125 also refers to container 1150, and in this example, has filled container 1150 with its data segments.

It is to be further appreciated that while containers 1130, 1140, and 1150 are shown as being stored in immutable storage system 1110 generally, these and other containers stored therein can, for example, be stored in one or more immutable storage objects (e.g., storage objects in the cloud), while containers not yet committed to immutable storage system 1110 can be stored in modifiable storage (e.g., block storage in the cloud, local storage, or other such modifiable storage). Further still, it is to be appreciated that, while described in terms of being stored in storage objects in the cloud, for example, the concept of immutable storage is broader, and comprehends any write-once storage mechanism/system (e.g., write-once, read many (WORM) storage units such as those described elsewhere herein, as well as other comparable technologies), in which containers such as those described herein might be stored and in some manner expire or be deleted.

Figure 12:
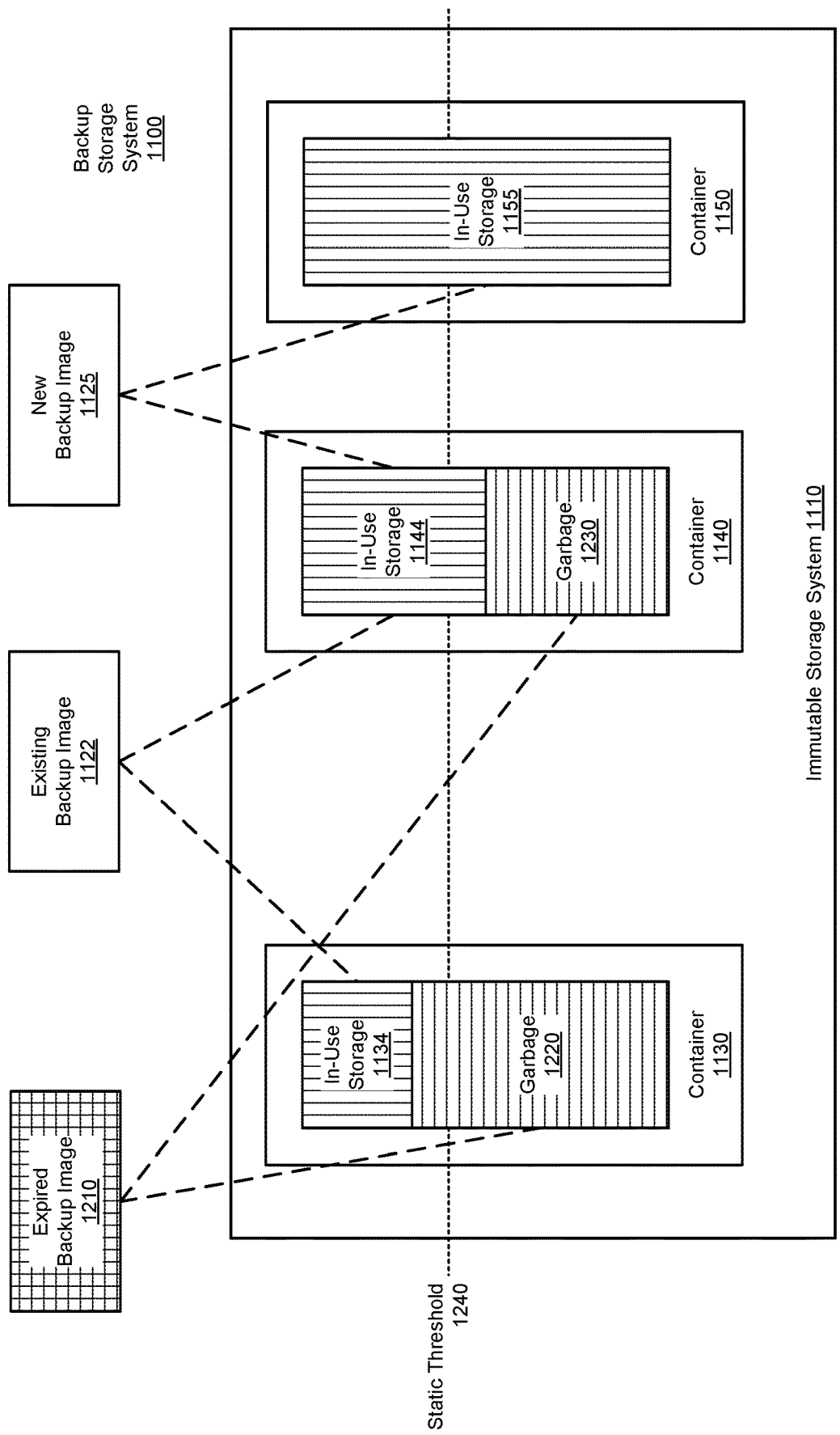
FIG. 12 is a simplified block diagram illustrating an example of a backup storage system. in which containers are stored in immutable storage, according to methods and systems such as those described herein.

FIG. 12 is a simplified block diagram illustrating an example of a backup storage system. in which containers are stored in immutable storage, according to methods and systems such as those described herein. As before, backup storage system 1100 is depicted as storing containers 1130, 1140, and 1150 in immutable storage system 1110. Also as before, existing backup image 1122 is depicted as referencing deduplicated data segments in in-use storage 1134 and in-use storage 1144, as before. However, existing backup image 1120 has now expired (or has otherwise been deleted), and so is now depicted as expired backup image 1200. In the examples presented herein, the expiration of existing backup image 1120 (or other dereferencing of the affected deduplicated data segments) results in the expiration (or other deletion) of in-use storage 1132 and in-use storage 1142. In-use storage 1132 and in-use storage 1142 are thus depicted in FIG. 12 as garbage 1220 and garbage 1230.

Also depicted in FIG. 12 is a statis threshold 1240. Statis threshold 1240, which may be determined, for example, using processes such as those discussed previously, is a static threshold to which a given container's garbage space percentage is compared. In the scenario depicted in FIG. 12, in-use storage 1132 and in-use storage 1142 becoming unreferenced (and so garbage 1220 and 1230) results in the garbage space percentage of container 1130 rising above statis threshold 1240. That being the case, the deduplicated data segments of container 1130 are designated as being unavailable for any subsequent referencing. In the example depicted in FIG. 12, new backup image 1125 is prevented from referencing data segments stored in container 1130 as a result. It will be appreciated that, given that the data segments of garbage 1220 are unreferenced, new backup image 1125 would not be expected to reference such deleted data segments. Further, even for the deduplicated data segments in in-use storage 1134, embodiments such as those described herein prevents new backup image 1125 from referencing those deduplicated data segments as well. For those deduplicated data segments, processes such as those described previously store such deduplicated data segments in another container that is available (e.g., as part of in-use storage 1155 of container 1150, in a container stored in modifiable storage, or the like). By contrast, while in-use storage 1142 is now unreferenced, container 1140 is still designated as available, and so, new backup image 1125 is able to reference deduplicated data segments stored in in-use storage 1144. As will be appreciated in light of the present disclosure, the process of designating containers as unavailable will ultimately result in the data segments of the given container ultimately becoming unreferenced and so deleted (as well as the creation and storage of new containers in immutable storage system 1110). In so doing, as time goes on, the deduplicated data segments of such containers will naturally become completely unreferenced, thereby allowing such containers to be deleted from immutable storage system 1110 at the end of the applicable retention period. Given that the cost of partially-filled containers increases the cost of storage (on a per-unit-of-storage of "live" data basis), costs can be reduced by preventing such partially-filled containers from continuing to be referenced (and so, maintained) for unacceptably long periods of time (particularly where the opportunity to delete such containers is only possible periodically, and also where the relative cost of storing a new container in immutable storage is comparatively low).

Figure 13:
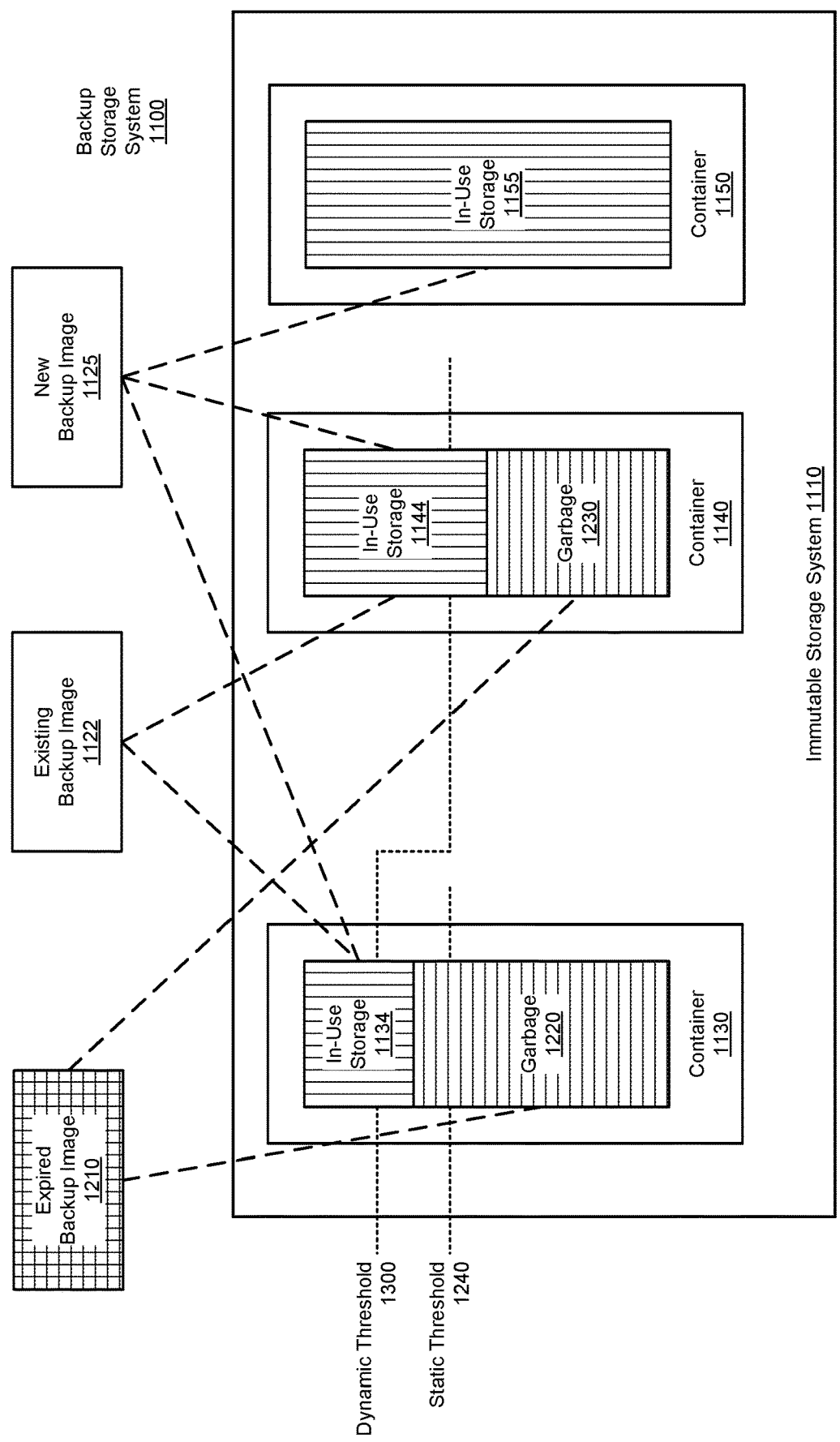
FIG. 13 is a simplified block diagram illustrating an example of a backup storage system. in which containers are stored in immutable storage, according to methods and systems such as those described herein.

FIG. 13 is a simplified block diagram illustrating an example of a backup storage system. in which containers are stored in immutable storage, according to methods and systems such as those described herein. As before, backup storage system 1100 is depicted as storing containers 1130, 1140, and 1150 in immutable storage system 1110. Also as before, existing backup image 1122 is depicted as referencing deduplicated data segments in in-use storage 1134 and in-use storage 1144, as before. However, existing backup image 1120 has now expired (or has otherwise been deleted), and so is now depicted as expired backup image 1200. In the examples presented herein, the expiration of existing backup image 1120 (or other dereferencing of the affected deduplicated data segments) results in the expiration (or other deletion) of in-use storage 1132 and in-use storage 1142. In-use storage 1132 and in-use storage 1142 are thus depicted in FIG. 13 as garbage 1220 and garbage 1230.

Also depicted in FIG. 13 is a dynamic threshold 1300. Dynamic threshold 1300, which may be determined, for example, using processes such as those discussed previously, is a dynamic threshold to which a given container's garbage space percentage is compared. In the scenario depicted in FIG. 13, in-use storage 1132 and in-use storage 1142 becoming unreferenced (and so garbage 1220 and 1230) results in the garbage space percentage of container 1130 rising above static threshold 1240, which is depicted in FIG. 13 for purposes of comparison (rather than for purposes of actual use). In the scenario depicted in FIG. 13, however, cost threshold represented by dynamic threshold 1300 is greater than static threshold 1240, and in this example, the garbage space percentage of container 1130 has not yet risen to the level of the cost represented by dynamic threshold 1300. That being the case, when deduplicating a new backup image such as new backup image 1125, new backup image 1125 is able to reference deduplicated data segments stored in in-use storage 1134. And while dynamic threshold 1300 has dropped when the garbage space percentage of container 1140 is compared thereto, in the example depicted, the garbage space percentage of container 1140 also does not yet meet dynamic threshold 1300, allowing new backup image 1125 to reference the deduplicated data segments therein.

Figure 14:
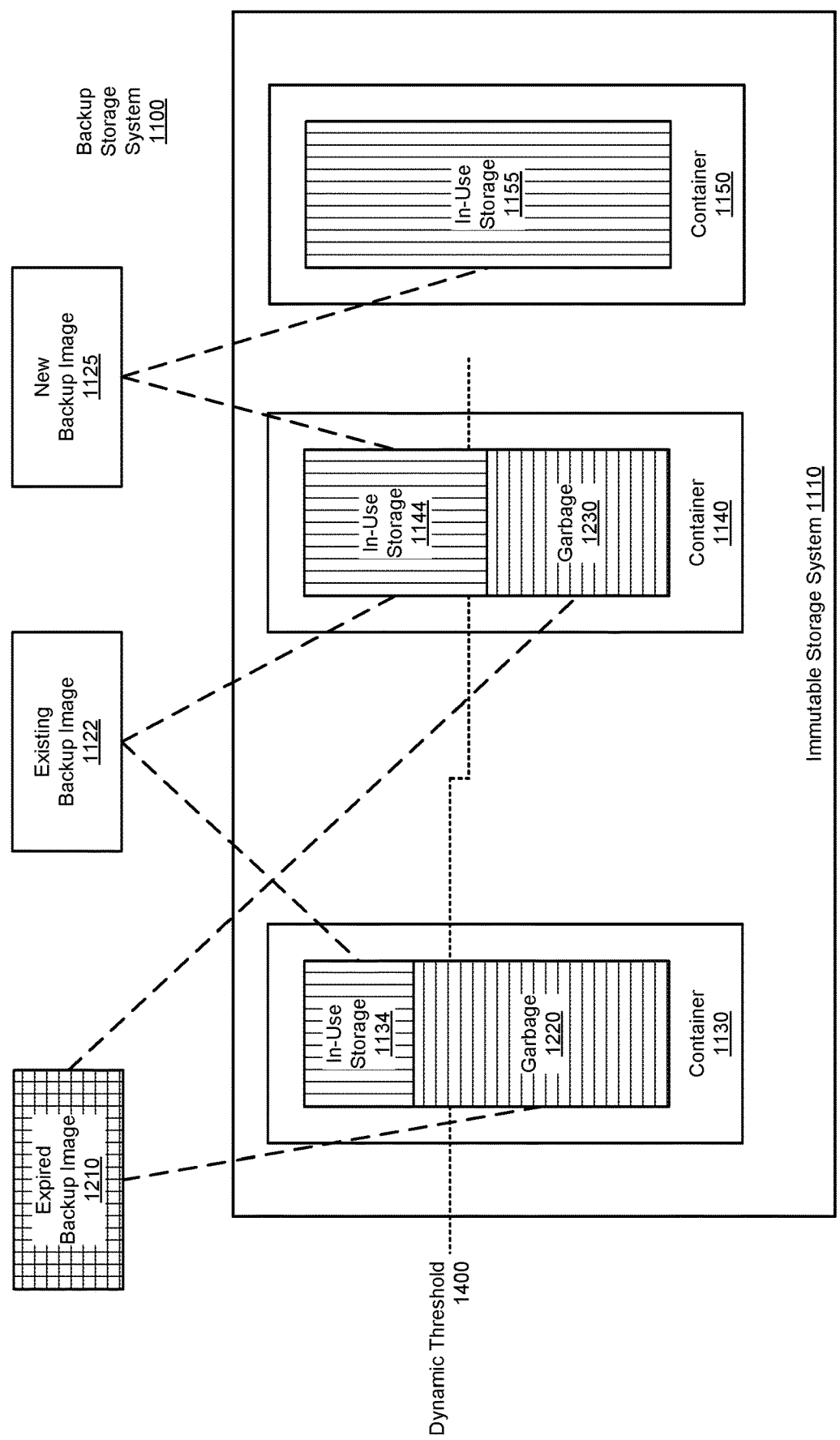
FIG. 14 is a simplified block diagram illustrating an example of a backup storage system. in which containers are stored in immutable storage, according to methods and systems such as those described herein.

FIG. 14 is a simplified block diagram illustrating an example of a backup storage system. in which containers are stored in immutable storage, according to methods and systems such as those described herein. As before, backup storage system 1100 is depicted as storing containers 1130, 1140, and 1150 in immutable storage system 1110. Also as before, existing backup image 1122 is depicted as referencing deduplicated data segments in in-use storage 1134 and in-use storage 1144, as before. However, existing backup image 1120 has now expired (or has otherwise been deleted), and so is now depicted as expired backup image 1200. In the examples presented herein, the expiration of existing backup image 1120 (or other dereferencing of the affected deduplicated data segments) results in the expiration (or other deletion) of in-use storage 1132 and in-use storage 1142. In-use storage 1132 and in-use storage 1142 are thus depicted as garbage 1220 and garbage 1230.

Also depicted in FIG. 14 is a dynamic threshold 1400. Dynamic threshold 1400, which may be determined, for example, using processes such as those discussed previously, is a dynamic threshold to which a given container's garbage space percentage is compared. In the scenario depicted in FIG. 14, in-use storage 1132 and in-use storage 1142 becoming unreferenced (and so garbage 1220 and 1230) results in the garbage space percentage of container 1130 rising above the cost threshold represented by dynamic threshold 1400 (and so meeting the level of the cost represented by dynamic threshold 1400). That being the case, when deduplicating a new backup image such as new backup image 1125, new backup image 1125 is prevented from referencing deduplicated data segments stored in in-use storage 1134. This being the case in this portion of the example, a deduplication system such as that described herein could store and reference such data segments in container 1150, as part of the creation of container 1150 and its storage in immutable storage system 1110. And while dynamic threshold 1400 has once again dropped when the garbage space percentage of container 1140 is compared thereto, in the example depicted, the garbage space percentage of container 1140 also does not yet meet dynamic threshold 1400, allowing new backup image 1125 to reference the deduplicated data segments therein (as in other examples).

Figure 15:
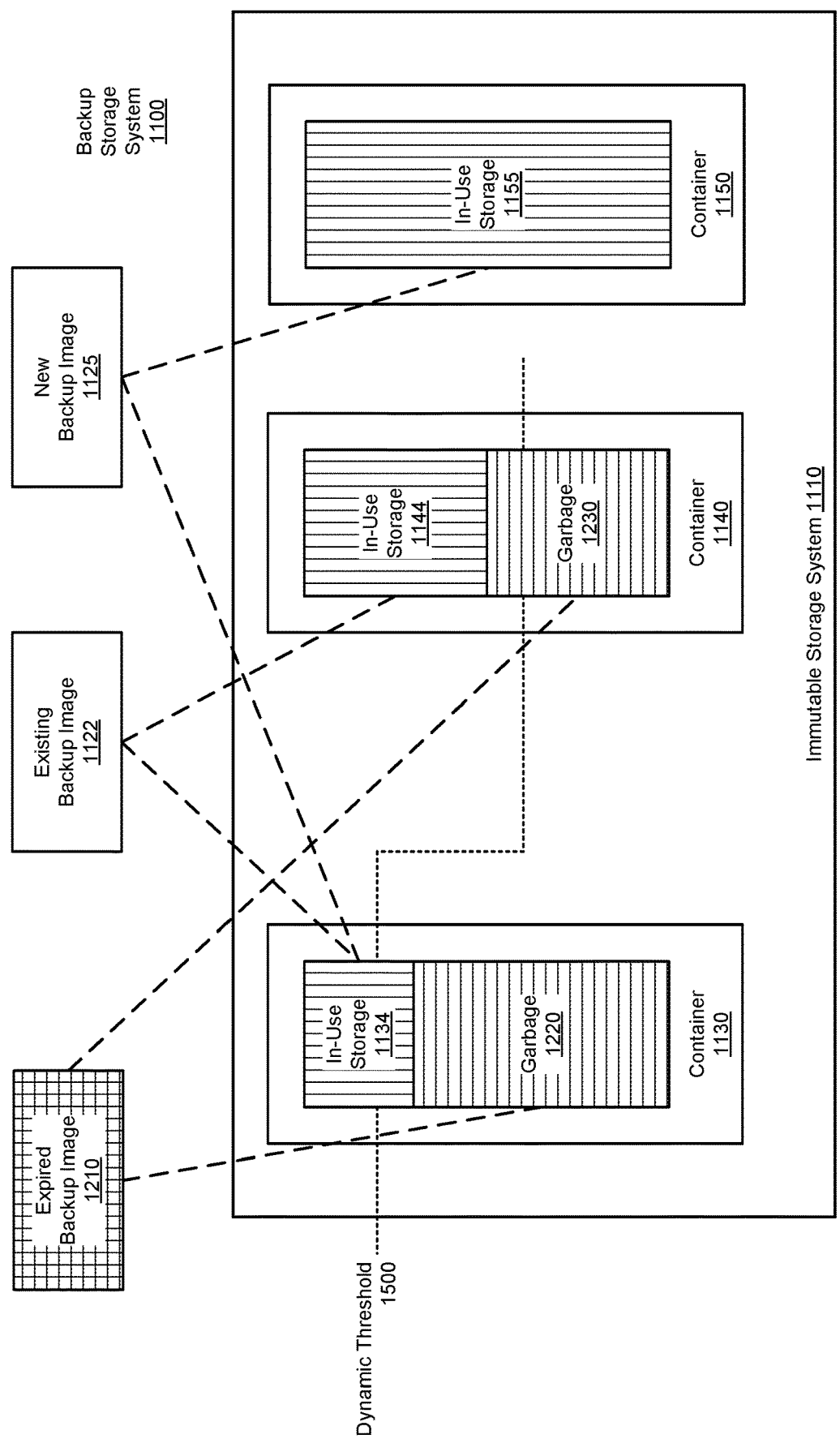
FIG. 15 is a simplified block diagram illustrating an example of a backup storage system. in which containers are stored in immutable storage, according to methods and systems such as those described herein.

FIG. 15 is a simplified block diagram illustrating an example of a backup storage system. in which containers are stored in immutable storage, according to methods and systems such as those described herein.

As before, backup storage system 1100 is depicted as storing containers 1130, 1140, and 1150 in immutable storage system 1110. Also as before, existing backup image 1122 is depicted as referencing deduplicated data segments in in-use storage 1134 and in-use storage 1144, as before. However, existing backup image 1120 has now expired (or has otherwise been deleted), and so is now depicted as expired backup image 1200. In the examples presented herein, the expiration of existing backup image 1120 (or other dereferencing of the affected deduplicated data segments) results in the expiration (or other deletion) of in-use storage 1132 and in-use storage 1142. In-use storage 1132 and in-use storage 1142 are thus depicted as garbage 1220 and garbage 1230.

Also depicted in FIG. 15 is a dynamic threshold 1500. Dynamic threshold 1500, which may be determined, for example, using processes such as those discussed previously, is a dynamic threshold to which a given container's garbage space percentage is compared. In the scenario depicted in FIG. 15, in-use storage 1132 and in-use storage 1142 becoming unreferenced (and so garbage 1220 and 1230) results in the garbage space percentage of container 1130 remaining below the cost threshold represented by dynamic threshold 1500 (and so not meeting the level of the cost represented by dynamic threshold 1500). That being the case, when deduplicating a new backup image such as new backup image 1125, new backup image 1125 can reference deduplicated data segments stored in in-use storage 1134. Dynamic threshold 1400 has once again dropped when the garbage space percentage of container 1140 is compared thereto, but has done so to a greater extent in the example depicted than in earlier examples. In this case, the garbage space percentage of container 1140 meets dynamic threshold 1500, which prevents new backup image 1125 from referencing the deduplicated data segments therein. This being the case in this portion of the example, a deduplication system such as that described herein could store and reference such data segments in container 1150, as part of the creation of container 1150 and its storage in immutable storage system 1110.

As will be appreciated from the examples presented in FIGS. 13-15, a dynamic threshold such as those described herein can involve during the operation of a deduplication system. That being the case, a dynamic threshold might change as between, dynamic threshold 1400 and dynamic threshold 1500. Such a change could occur in either direction, thereby changing the availability of container 1130, in certain embodiments. For example, a change from dynamic threshold 1502 dynamic threshold 1400 could result in container 1130 being unavailable for an intervening new backup image to reference, even though container 1130 had previously been available for referencing and had not undergone any further dereferencing. Conversely, such an intervening new backup image might be able to reference the deduplicated data segments in in-use storage 1134 in a scenario in which the dynamic threshold in question changed from dynamic threshold 1402 dynamic threshold 1500 (thereby making container 1130 available for referencing), despite container 1130 having been previously unavailable for such referencing. The foregoing examples, as well as other such permutations of methods and systems such as those described herein, are intended to be comprehended hereby.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 160), one or more applications, and data. Examples of such computing and network environments are described below with reference to FIGS. 16 and 17.

Figure 16:
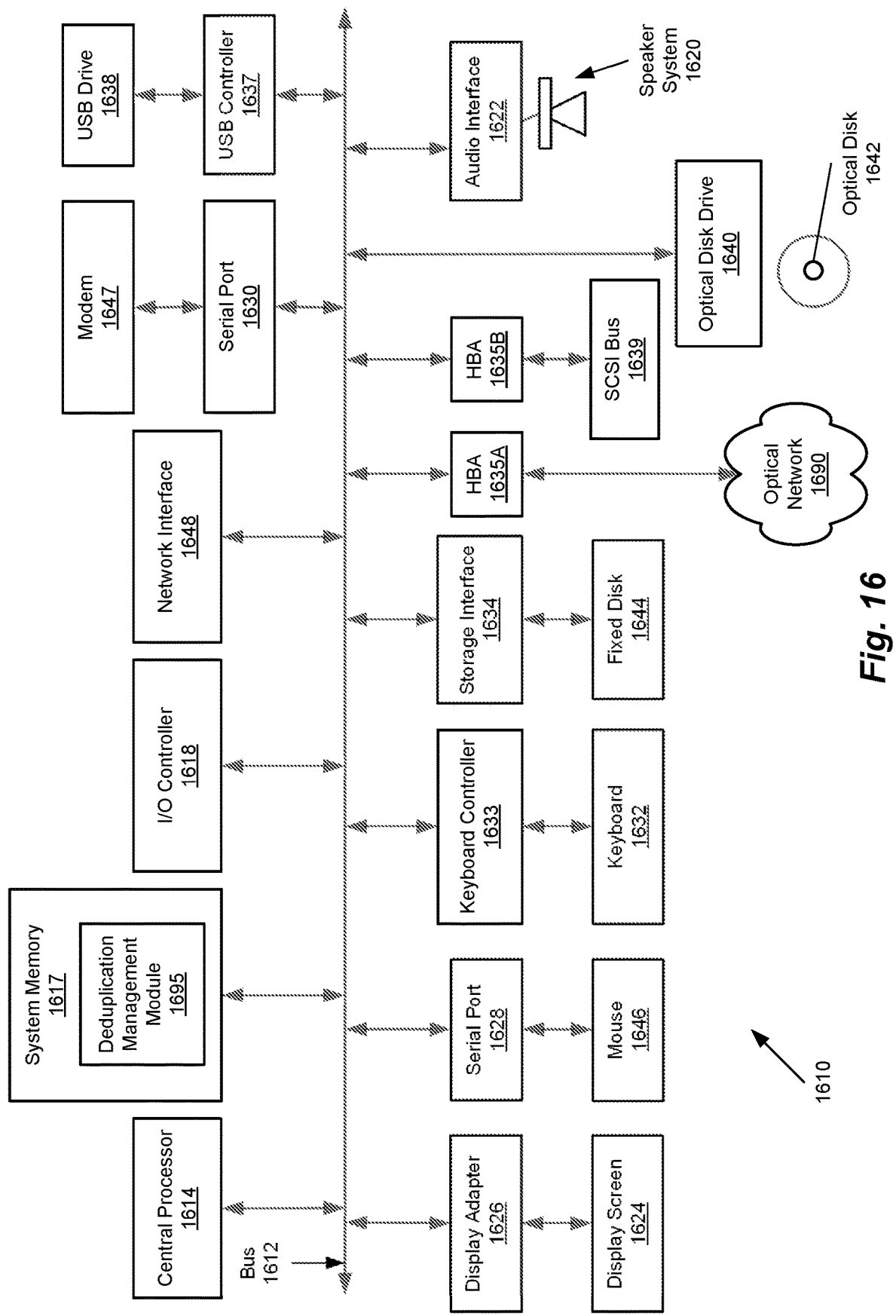
FIG. 16 is a simplified block diagram illustrating components of an example computer system suitable for implementing the present disclosure, according to one embodiment.

FIG. 16 depicts a block diagram of a computer system 1610 suitable for implementing aspects of the systems described herein. Computer system 1610 includes a bus 1612 which interconnects major subsystems of computer system 1610, such as a central processor 1614, a system memory 1617 (typically RAM, but which may also include ROM, flash RAM, or the like), an input/output controller 1618, an external audio device, such as a speaker system 1620 via an audio output interface 1622, an external device, such as a display screen 1624 via display adapter 1626, serial ports 1628 and 1630, a keyboard 1632 (interfaced with a keyboard controller 1633), a storage interface 1634, a USB controller 1637 operative to receive a USB drive 1638, a host bus adapter (HBA) interface card 1635A operative to connect with a optical network 1690, a host bus adapter (HBA) interface card 1635B operative to connect to a SCSI bus 1639, and an optical disk drive 1640 operative to receive an optical disk 1642. Also included are a mouse 1646 (or other point-and-click device, coupled to bus 1612 via serial port 1628), a modem 1647 (coupled to bus 1612 via serial port 1630), and a network interface 1648 (coupled directly to bus 1612).

Bus 1612 allows data communication between central processor 1614 and system memory 1617, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1610 are generally stored on and accessed from a computer-readable storage medium, such as a hard disk drive (e.g., fixed disk 1644), an optical drive (e.g., optical drive 1640), a universal serial bus (USB) controller 1637, or other computer-readable storage medium.

Storage interface 1634, as with the other storage interfaces of computer system 1610, can connect to a standard computer-readable medium for storage and/or retrieval of information, such as a fixed disk drive 1644. Fixed disk drive 1644 may be a part of computer system 1610 or may be separate and accessed through other interface systems. Modem 1647 may provide a direct connection to a remote server via a telephone link or to the Internet via an internet service provider (ISP). Network interface 1648 may provide a direct connection to a remote server via a direct network link to the Internet via a POP (point of presence). Network interface 1648 may provide such connection using wireless techniques, including digital cellular telephone connection, Cellular Digital Packet Data (CDPD) connection, digital satellite data connection or the like. Also depicted as part of computer system 1610 is a deduplication management module 1695, which is resident in system memory 1617 and provides functionality and operations comparable to the deduplication processes described earlier herein.

Many other devices or subsystems (not shown) may be connected in a similar manner (e.g., document scanners, digital cameras and so on). Conversely, all of the devices shown in FIG. 16 need not be present to practice the systems described herein. The devices and subsystems can be interconnected in different ways from that shown in FIG. 16. The operation of a computer system such as that shown in FIG. 16 will be readily understood in light of the present disclosure. Code to implement portions of the systems described herein can be stored in computer-readable storage media such as one or more of system memory 1617, fixed disk 1644, optical disk 1642, or USB drive 1638. The operating system provided on computer system 1610 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 17:
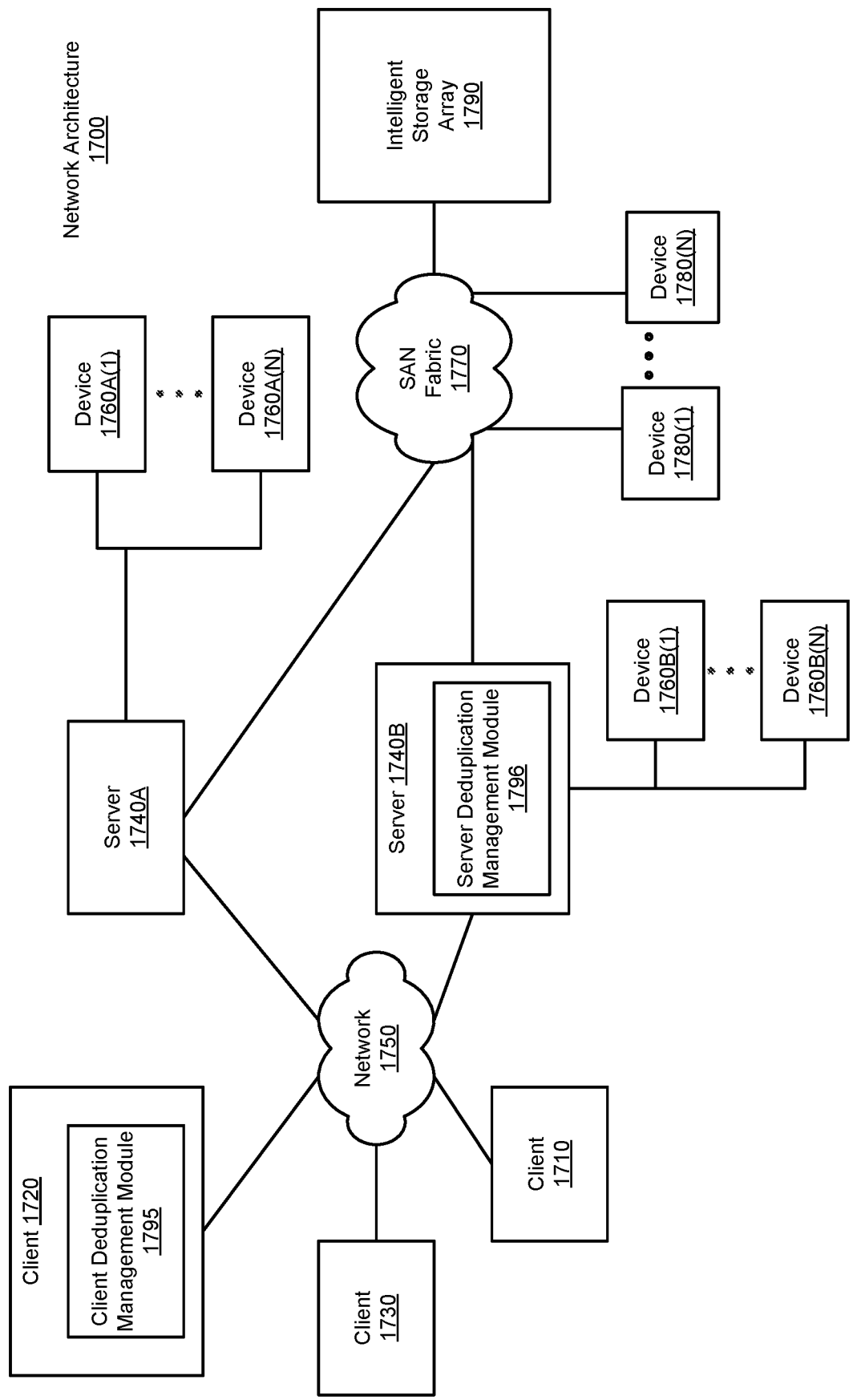
FIG. 17 is a simplified block diagram illustrating components of an example computer system suitable for implementing embodiments of the present disclosure, methods and systems such as those described herein.

FIG. 17 is a block diagram depicting a network architecture 1700 in which client systems 1710, 1720 and 1730, as well as storage servers 1740A and 1740B (any of which can be implemented using computer system 1710), are coupled to a network 1750. Storage server 1740A is further depicted as having storage devices 1760A(1)-(N) directly attached, and storage server 1740B is depicted with storage devices 1760B(1)-(N) directly attached. Storage servers 1740A and 1740B are also connected to a SAN fabric 1770, although connection to a storage area network is not required for operation. SAN fabric 1770 supports access to storage devices 1780(1)-(N) by storage servers 1740A and 1740B, and so by client systems 1710, 1720 and 1730 via network 1750. An intelligent storage array 1790 is also shown as an example of a specific storage device accessible via SAN fabric 1770.

Also depicted as part of network architecture 1700 are a client deduplication management module 1795 (installed in client 1720), and a server deduplication management module 1796 (installed in server 1740B), which are comparable in function and operation to various of the deduplication management modules described earlier herein. For example, using the components depicted in FIG. 6, client deduplication management module 1795 can provide functionality associated with the generation of a backup image such as those described herein. Further, server deduplication management module 1796 can support storage and maintenance of one or more fingerprint catalogs, as well as the functionalities provided in storing containers for the various backup images deduplicated and stored in immutable storage.

With reference to computer system 1610, modem 1647, network interface 1648 or some other method can be used to provide connectivity from each of client computer systems 1710, 1720 and 1730 to network 1750. Client systems 1710, 1720 and 1730 are able to access information on storage server 1740A or 1740B using, for example, a web browser or other client software (not shown). Such a client allows client systems 1710, 1720 and 1730 to access data hosted by storage server 1740A or 1740B or one of storage devices 1760A(1)-(N), 1760B(1)-(N), 1780(1)-(N) or intelligent storage array 1790. FIG. 17 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components. Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present disclosure has been described in connection with several embodiments, the description of such embodiments is not intended to be limited to the specific forms set forth herein. On the contrary, it is intended to cover such alternatives, modifications, and equivalents as can be reasonably included within the scope of the appended claims.

What is claimed is:

1. A method comprising:
performing an update process on at least one of a plurality of existing data storage constructs, comprising
determining a state of the at least one of the plurality of existing data storage constructs,
comparing the state of the at least one of the plurality of existing data storage constructs and one or more thresholds determined by performing a threshold determination process,
determining whether the state of the at least one of the plurality of existing data storage constructs meets the one or more thresholds, and
in response to the state of the at least one of the plurality of existing data storage constructs meeting the one or more thresholds, designating the at least one of the plurality of existing data storage constructs as being unavailable;
selecting a unit of data of a backup image;
determining whether a duplicate unit of data is stored in an existing data storage construct of the plurality of existing of data storage constructs, wherein
the duplicate unit of data is a duplicate of the unit of data, and
the existing data storage construct of the plurality of existing of data storage constructs is stored in immutable storage; and
in response to a determination that the duplicate unit of data exists in the existing data storage construct of the plurality of existing of data storage constructs,
determining whether the existing data storage construct of the plurality of existing of data storage constructs is designated as being available to be referenced,
in response to the existing data storage construct of the plurality of existing of data storage constructs being designated as being available to be referenced, updating a reference to the duplicate unit of data, and
in response to the existing data storage construct of the plurality of existing of data storage constructs being designated as being unavailable to be referenced, storing the unit of data in a new data storage construct.

2. The method of claim 1, further comprising:
further in response to the existing data storage construct of the plurality of existing of data storage constructs being designated as being unavailable to be referenced, adding data object metadata to the new data storage construct, wherein the data object metadata is associated with the unit of data.

3. The method of claim 2, further comprising:
further in response to the existing data storage construct of the plurality of existing of data storage constructs being designated as being unavailable to be referenced, updating a reference to the duplicate unit of data, wherein
the backup image comprises the reference.

4. The method of claim 1, wherein
the backup image comprises the reference.

5. The method of claim 1, wherein
the backup image is one of a plurality of backup images,
the immutable storage periodically permits deletion of the existing data storage construct of the plurality of existing of data storage constructs, and
the method further comprises
deleting the existing data storage construct of the plurality of existing of data storage constructs, if none of the plurality of backup images comprise any references to the existing data storage construct of the plurality of existing of data storage constructs.

6. The method of claim 1, wherein the method further comprises:
determining the one or more thresholds, wherein
the determining the one or more thresholds comprises performing the threshold determination process.

7. The method of claim 6, further comprising:
determining whether the at least one of the plurality of existing data storage constructs is designated as being available; and
in response to a determination that the at least one of the plurality of existing data storage constructs is designated as being available, performing the update process on the at least one of the plurality of existing data storage constructs.

8. The method of claim 6, wherein
the determining the one or more thresholds comprises
determining a retention period of a new container stored in the immutable storage, and
determining a remaining retention period, wherein
the remaining retention period is a portion of a retention period remaining for the at least one of the plurality of existing data storage constructs; and
the determining the state of the at least one of the plurality of existing data storage constructs comprises
determining a size of the at least one of the plurality of existing data storage constructs, and
determining an amount of expired data stored in the at least one of the plurality of existing data storage constructs.

9. The method of claim 8, further comprising:
calculating the one or more thresholds, wherein
the one or more thresholds are calculated based, at least in part, on the retention period and the remaining retention period; and
determining the state of the at least one of the plurality of existing data storage constructs, wherein
the state of the at least one of the plurality of existing data storage constructs is determined based, at least in part, on the size of the at least one of the plurality of existing data storage constructs and the amount of expired data.

10. The method of claim 8, wherein
the state of the at least one of the plurality of existing data storage constructs meets the one or more thresholds if $$G/C > R_R/R_{NEW}$$

where
C=the size of the at least one of the plurality of existing data storage constructs,
G=the amount of expired data stored in the at least one of the plurality of existing data storage constructs,
$R_R$=the remaining retention period, and
$R_{NEW}$=the retention period.

11. The method of claim 8, wherein
the state of the at least one of the plurality of existing data storage constructs meets the one or more thresholds if, for a cost function Cost (an amount of data, an input retention period), $$\text{Cost}(C,R_R) + \text{Cost}((C-G),R_{NEW}) < \text{Cost}(C,R_{NEW})$$

where
C=the size of the at least one of the plurality of existing data storage constructs,
G=the amount of expired data stored in the at least one of the plurality of existing data storage constructs,
$R_R$=the remaining retention period, and
$R_{NEW}$=the retention period.

12. A non-transitory computer-readable storage medium, comprising program instructions, which, when executed by one or more processors of a computing system, perform a method comprising:
performing an update process on at least one of a plurality of existing data storage constructs, comprising
determining a state of the at least one of the plurality of existing data storage constructs,
comparing the state of the at least one of the plurality of existing data storage constructs and one or more thresholds determined by performing a threshold determination process,
determining whether the state of the at least one of the plurality of existing data storage constructs meets the one or more thresholds, and
in response to the state of the at least one of the plurality of existing data storage constructs meeting the one or more thresholds, designating the at least one of the plurality of existing data storage constructs as being unavailable;
selecting a unit of data of a backup image;
determining whether a duplicate unit of data is stored in an existing data storage construct, wherein
the duplicate unit of data is a duplicate of the unit of data, and
the existing data storage construct of the plurality of existing of data storage constructs is stored in immutable storage; and
in response to a determination that the duplicate unit of data exists in the existing data storage construct of the plurality of existing of data storage constructs,
determining whether the existing data storage construct of the plurality of existing of data storage constructs is designated as being available to be referenced,
in response to the existing data storage construct of the plurality of existing of data storage constructs being designated as being available to be referenced, updating a reference to the duplicate unit of data, and in response to the existing data storage construct of the plurality of existing of data storage constructs being designated as being unavailable to be referenced, storing the unit of data in a new data storage construct.

13. The non-transitory computer-readable storage medium of claim 12, wherein the method further comprises:
further in response to the existing data storage construct of the plurality of existing of data storage constructs being designated as being unavailable to be referenced, adding data object metadata to the new data storage construct, wherein the data object metadata is associated with the unit of data; and
further in response to the existing data storage construct of the plurality of existing of data storage constructs being designated as being unavailable to be referenced, updating a reference to the duplicate unit of data, wherein
the backup image comprises the reference.

14. The non-transitory computer-readable storage medium of claim 12, wherein
the backup image comprises the reference,
the backup image is one of a plurality of backup images,
the immutable storage periodically permits deletion of the existing data storage construct of the plurality of existing of data storage constructs, and
the method further comprises
deleting the existing data storage construct of the plurality of existing of data storage constructs, if none of the plurality of backup images comprise any references to the existing data storage construct of the plurality of existing of data storage constructs.

15. The non-transitory computer-readable storage medium of claim 12, wherein the method further comprises:
determining the one or more thresholds, wherein
the determining the one or more thresholds comprises performing the threshold determination process.

16. The non-transitory computer-readable storage medium of claim 15, wherein the method further comprises:
determining whether the at least one of the plurality of existing data storage constructs is designated as being available; and
in response to a determination that the at least one of the plurality of existing data storage constructs is designated as being available, performing the update process on the at least one of the plurality of existing data storage constructs.

17. The non-transitory computer-readable storage medium of claim 15, wherein
the determining the one or more thresholds comprises
determining a retention period of a new container stored in the immutable storage, and
determining a remaining retention period, wherein
the remaining retention period is a portion of a retention period remaining for the at least one of the plurality of existing data storage constructs;
the determining the state of the at least one of the plurality of existing data storage constructs comprises
determining a size of the at least one of the plurality of existing data storage constructs, and
determining an amount of expired data stored in the at least one of the plurality of existing data storage constructs; and
the method further comprises
calculating the one or more thresholds, wherein the one or more thresholds are calculated based, at least in part, on the retention period and the remaining retention period; and determining the state of the at least one of the plurality of existing data storage constructs, wherein
the state of the at least one of the plurality of existing data storage constructs is determined based, at least in part, on the size of the at least one of the plurality of existing data storage constructs and the amount of expired data.

18. A computing system comprising:

one or more processors; and a computer-readable storage medium coupled to the one or more processors, comprising program instructions, which, when executed by the one or more processors, perform a method comprising performing an update process on at least one of a plurality of existing data storage constructs, comprising determining a state of the at least one of the plurality of existing data storage constructs, comparing the state of the at least one of the plurality of existing data storage constructs and one or more thresholds determined by performing a threshold determination process, determining whether the state of the at least one of the plurality of existing data storage constructs meets the one or more thresholds, and in response to the state of the at least one of the plurality of existing data storage constructs meeting the one or more thresholds, designating the at least one of the plurality of existing data storage constructs as being unavailable, selecting a unit of data of a backup image, determining whether a duplicate unit of data is stored in an existing data storage construct, wherein
the duplicate unit of data is a duplicate of the unit of data, and
the existing data storage construct of the plurality of existing of data storage constructs is stored in immutable storage, and in response to a determination that the duplicate unit of data exists in the existing data storage construct of the plurality of existing of data storage constructs,
determining whether the existing data storage construct of the plurality of existing of data storage constructs is designated as being available to be referenced,
in response to the existing data storage construct of the plurality of existing of data storage constructs being designated as being available to be referenced, updating a reference to the duplicate unit of data, and
in response to the existing data storage construct of the plurality of existing of data storage constructs being designated as being unavailable to be referenced, storing the unit of data in a new data storage construct.

* * * * *